(12) United States Patent
Zilles et al.

(10) Patent No.: US 7,225,404 B1
(45) Date of Patent: May 29, 2007

(54) METHOD AND APPARATUS FOR DETERMINING FORCES TO BE APPLIED TO A USER THROUGH A HAPTIC INTERFACE

(75) Inventors: Craig B. Zilles, Middleton, WI (US); J. Kenneth Salisbury, Jr., Cambridge, MA (US); Thomas H. Massie, Derry, NH (US); David Lawrence Brock, Natick, MA (US); Mandayam A. Srinivasan, West Newton, MA (US); Hugh B. Morgenbesser, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 497 days.

(21) Appl. No.: 10/055,565

(22) Filed: Oct. 26, 2001

Related U.S. Application Data

(63) Continuation of application No. 09/324,137, filed on Jun. 2, 1999, now Pat. No. 6,369,834, which is a continuation of application No. 08/627,432, filed on Apr. 4, 1996, now Pat. No. 6,111,577.

(51) Int. Cl.
   *G06F 3/01* (2006.01)
   *G06F 3/02* (2006.01)
   *G06F 3/03* (2006.01)
   *G06F 3/033* (2006.01)
   *G06F 17/10* (2006.01)

(52) U.S. Cl. ............... 715/701; 715/702; 715/757; 715/848

(58) Field of Classification Search .......... 345/701, 345/702, 706, 757; 715/701, 702, 757, 848
See application file for complete search history.

(56) References Cited

U.S. PATENT DOCUMENTS

| 3,168,203 A | 2/1965 | Gallistel |
| 3,263,824 A | 8/1966 | Jones et al. |
| 3,449,008 A | 6/1969 | Colechia |

(Continued)

FOREIGN PATENT DOCUMENTS

EP 0 915 434 A2 5/1999

(Continued)

OTHER PUBLICATIONS

Avila et al., "A Haptic Interaction Method for Volume Visualization," GE Corporate Research & Development, Schenectady, NY, pp. 1-9 (1996).

(Continued)

*Primary Examiner*—Kristine Kincaid
*Assistant Examiner*—Namitha Pillai
(74) *Attorney, Agent, or Firm*—Goodwin Procter LLP

(57) ABSTRACT

A method and apparatus for determining forces to be applied to a user through a haptic interface. The method includes the steps of generating a representation of an object in graphic space, sensing the position of the user in real space and calculating a force to be applied to a user in response to the user's haptic interface and the user's fiducial object. The user's fiducial object represents the location in graphic space at which the user's haptic interface would be located if the haptic interface could not penetrate the surfaces of virtual objects.

44 Claims, 13 Drawing Sheets

U.S. PATENT DOCUMENTS

| | | | |
|---|---|---|---|
| 3,618,786 A | 11/1971 | Fick | |
| 3,637,092 A | 1/1972 | George et al. | |
| 4,062,455 A | 12/1977 | Flatau | |
| 4,150,803 A | 4/1979 | Fernandez | |
| 4,302,138 A | 11/1981 | Zarudiansky | |
| 4,510,574 A | 4/1985 | Guttet et al. | |
| 4,604,016 A | 8/1986 | Joyce | |
| 4,632,341 A | 12/1986 | Repperger et al. | |
| 4,654,648 A | 3/1987 | Herrington et al. | |
| 4,655,673 A | 4/1987 | Hawkes | |
| 4,661,032 A | 4/1987 | Arai | |
| 4,676,002 A | 6/1987 | Slocum | |
| 4,686,522 A | 8/1987 | Hernandez et al. | |
| 4,795,296 A | 1/1989 | Jau | |
| 4,800,721 A | 1/1989 | Cemenska et al. | |
| 4,837,734 A | 6/1989 | Ichikawa et al. | |
| 4,839,838 A | 6/1989 | LaBiche et al. | |
| 4,888,538 A | 12/1989 | Dimitrov et al. | |
| 4,893,981 A | 1/1990 | Yoshinada et al. | |
| 4,907,970 A | 3/1990 | Meenen, Jr. | |
| 4,907,973 A | 3/1990 | Hon | |
| 4,973,111 A | 11/1990 | Haacke et al. | 324/309 |
| 4,973,215 A | 11/1990 | Karlen et al. | |
| 4,982,504 A | 1/1991 | Söderberg et al. | |
| 4,988,981 A | 1/1991 | Zimmerman et al. | |
| 5,004,391 A | 4/1991 | Burdea | |
| 5,007,300 A | 4/1991 | Siva | |
| 5,018,922 A | 5/1991 | Yoshinada et al. | |
| 5,019,761 A | 5/1991 | Kraft | |
| 5,038,089 A | 8/1991 | Szakaly | |
| 5,040,306 A | 8/1991 | McMurtry et al. | |
| 5,044,956 A | 9/1991 | Behensky et al. | |
| 5,053,975 A | 10/1991 | Tsuchihashi et al. | |
| 5,072,361 A | 12/1991 | Davis et al. | |
| 5,088,046 A | 2/1992 | McMurtry | |
| 5,088,055 A | 2/1992 | Oyama | |
| 5,103,404 A | 4/1992 | McIntosh | |
| 5,105,367 A | 4/1992 | Tsuchihashi et al. | |
| 5,116,051 A | 5/1992 | Moncrief et al. | |
| 5,116,180 A | 5/1992 | Fung et al. | |
| 5,130,632 A | 7/1992 | Ezawa et al. | |
| 5,131,844 A | 7/1992 | Marinaccio et al. | |
| 5,142,931 A | 9/1992 | Menahem | |
| 5,143,505 A | 9/1992 | Burdea et al. | |
| 5,184,319 A | 2/1993 | Kramer | |
| 5,185,561 A | 2/1993 | Good et al. | |
| 5,189,806 A | 3/1993 | McMurtry et al. | |
| 5,193,963 A | 3/1993 | McAffee | |
| 5,204,824 A | 4/1993 | Fujimaki | |
| 5,220,260 A | 6/1993 | Schuler | |
| 5,223,776 A | 6/1993 | Radke et al. | |
| 5,237,647 A | 8/1993 | Roberts et al. | |
| 5,239,246 A | 8/1993 | Kim | |
| 5,255,211 A | 10/1993 | Redmond | |
| 5,264,768 A | 11/1993 | Gregory et al. | |
| 5,266,875 A | 11/1993 | Slotine et al. | |
| 5,333,257 A | 7/1994 | Merrill et al. | |
| 5,354,162 A | 10/1994 | Burdea et al. | |
| 5,382,885 A | 1/1995 | Salcudean et al. | |
| 5,389,865 A | 2/1995 | Jacobus et al. | |
| 5,396,265 A | 3/1995 | Ulrich et al. | |
| 5,414,337 A | 5/1995 | Schuler | |
| 5,429,140 A | 7/1995 | Burdea et al. | |
| 5,438,529 A | 8/1995 | Rosenberg et al. | |
| 5,446,834 A | 8/1995 | Deering | |
| 5,459,382 A | 10/1995 | Jacobus et al. | |
| 5,482,051 A | 1/1996 | Reddy et al. | |
| 5,489,830 A | 2/1996 | Fernandez | |
| 5,497,452 A | 3/1996 | Shimizu et al. | |
| 5,506,785 A | 4/1996 | Blank et al. | 700/98 |
| 5,515,078 A | 5/1996 | Greschler et al. | |
| 5,555,894 A | 9/1996 | Doyama et al. | |
| 5,559,412 A | 9/1996 | Schuler | |
| 5,576,727 A | 11/1996 | Rosenberg et al. | |
| 5,587,937 A * | 12/1996 | Massie et al. | 703/7 |
| 5,589,854 A | 12/1996 | Tsai | |
| D377,932 S | 2/1997 | Schena et al. | |
| 5,623,582 A | 4/1997 | Rosenberg | |
| 5,623,642 A | 4/1997 | Katz et al. | |
| 5,625,576 A | 4/1997 | Massie et al. | |
| 5,629,594 A | 5/1997 | Jacobus et al. | |
| 5,642,469 A | 6/1997 | Hannaford et al. | |
| 5,659,493 A | 8/1997 | Kiridena et al. | |
| 5,666,138 A | 9/1997 | Culver | |
| 5,691,898 A | 11/1997 | Rosenberg et al. | |
| 5,694,013 A | 12/1997 | Stewart et al. | |
| 5,701,140 A | 12/1997 | Rosenberg et al. | |
| 5,721,566 A | 2/1998 | Rosenberg et al. | |
| 5,724,264 A | 3/1998 | Rosenberg et al. | |
| 5,731,804 A | 3/1998 | Rosenberg | |
| 5,734,373 A | 3/1998 | Rosenberg et al. | |
| 5,737,505 A | 4/1998 | Shaw et al. | |
| 5,739,811 A | 4/1998 | Rosenberg et al. | |
| 5,742,278 A | 4/1998 | Chen et al. | |
| 5,751,289 A | 5/1998 | Myers | |
| 5,754,023 A | 5/1998 | Roston et al. | |
| 5,767,839 A | 6/1998 | Rosenberg | |
| 5,769,640 A | 6/1998 | Jacobus et al. | |
| 5,774,130 A | 6/1998 | Horikawa et al. | |
| 5,784,542 A | 7/1998 | Ohm et al. | |
| 5,790,108 A | 8/1998 | Salcudean et al. | |
| 5,798,752 A | 8/1998 | Buxton et al. | |
| 5,800,177 A | 9/1998 | Gillio | |
| 5,800,178 A | 9/1998 | Gillio | |
| 5,800,179 A | 9/1998 | Bailey | |
| 5,802,353 A | 9/1998 | Avila et al. | |
| 5,803,738 A | 9/1998 | Latham | |
| 5,805,140 A | 9/1998 | Rosenberg et al. | |
| 5,821,920 A | 10/1998 | Rosenberg et al. | |
| 5,825,308 A | 10/1998 | Rosenberg | |
| 5,828,197 A | 10/1998 | Martin et al. | |
| 5,831,408 A | 11/1998 | Jacobus et al. | |
| 5,844,392 A | 12/1998 | Peurach et al. | |
| 5,847,956 A | 12/1998 | Bronfeld et al. | |
| 5,859,934 A | 1/1999 | Green | |
| 5,872,438 A | 2/1999 | Roston | |
| 5,873,106 A | 2/1999 | Joseph | |
| 5,880,714 A | 3/1999 | Rosenberg et al. | |
| 5,881,178 A | 3/1999 | Tsykalov et al. | 382/260 |
| 5,882,206 A | 3/1999 | Gillio | |
| 5,889,670 A | 3/1999 | Schuler et al. | |
| 5,898,599 A | 4/1999 | Massie et al. | |
| 5,903,270 A | 5/1999 | Gentry et al. | |
| 5,903,886 A | 5/1999 | Heimlich et al. | |
| 5,913,727 A | 6/1999 | Ahdoot | |
| 5,929,607 A | 7/1999 | Rosenberg et al. | |
| 5,929,846 A | 7/1999 | Rosenberg et al. | |
| 5,956,484 A | 9/1999 | Rosenberg et al. | |
| 5,963,212 A | 10/1999 | Bakalash | |
| 5,973,678 A | 10/1999 | Stewart | |
| 5,988,862 A | 11/1999 | Kacyra et al. | |
| 6,040,840 A | 3/2000 | Koshiba et al. | 345/441 |
| 6,046,726 A | 4/2000 | Keyson | |
| 6,061,004 A | 5/2000 | Rosenberg | 341/20 |
| 6,064,394 A | 5/2000 | Morrison | |
| 6,084,587 A | 7/2000 | Tarr et al. | |
| 6,111,577 A | 8/2000 | Zilles et al. | |
| 6,131,097 A | 10/2000 | Peurach et al. | |
| 6,191,796 B1 | 2/2001 | Tarr | |
| 6,211,848 B1 | 4/2001 | Plesniak et al. | |
| 6,219,032 B1 | 4/2001 | Rosenberg et al. | 345/157 |
| 6,226,003 B1 | 5/2001 | Akeley | |
| 6,308,144 B1 | 10/2001 | Bronfeld et al. | |
| 6,337,678 B1 | 1/2002 | Fish | |

| | | | |
|---|---|---|---|
| 6,342,880 | B2 | 1/2002 | Rosenberg et al. |
| 6,369,834 | B1 | 4/2002 | Zilles et al. |
| 6,384,822 | B1 | 5/2002 | Bilodeau et al. |
| 6,417,638 | B1 | 7/2002 | Guy et al. |
| 6,421,048 | B1 | 7/2002 | Shih et al. |
| 6,552,722 | B1 | 4/2003 | Shih et al. |
| 6,608,631 | B1 | 8/2003 | Milliron |
| 6,671,651 | B2 | 12/2003 | Goodwin et al. |
| 6,707,458 | B1 | 3/2004 | Leather et al. ............... 345/582 |
| 2002/0075283 | A1 | 6/2002 | Payne |
| 2002/0089500 | A1 | 7/2002 | Jennings et al. |
| 2002/0154132 | A1 | 10/2002 | Dumesny et al. ........... 345/582 |
| 2002/0158842 | A1 | 10/2002 | Guy et al. |
| 2003/0117411 | A1 | 6/2003 | Fujiwara et al. |
| 2003/0128208 | A1 | 7/2003 | Shih et al. |
| 2003/0191554 | A1 | 10/2003 | Russell et al. |
| 2005/0060130 | A1 | 3/2005 | Shapiro et al. ................. 703/2 |
| 2005/0062738 | A1 | 3/2005 | Handley et al. ............ 345/419 |
| 2005/0168460 | A1 | 8/2005 | Radzan et al. ............... 345/419 |

FOREIGN PATENT DOCUMENTS

| | | |
|---|---|---|
| GB | 2389764 | 12/2003 |
| GB | 2410351 | 7/2005 |
| WO | WO 95/02801 | 1/1995 |
| WO | WO 96/16397 | 5/1996 |
| WO | WO 96/22591 | 7/1996 |
| WO | WO 96/42078 | 12/1996 |
| WO | WO 97/06410 | 2/1997 |
| WO | WO 97/12337 | 4/1997 |
| WO | WO 97/12357 | 4/1997 |
| WO | WO 97/19440 | 5/1997 |
| WO | WO 97/21160 | 6/1997 |
| WO | WO 97/44775 | 11/1997 |
| WO | WO 98/06024 | 2/1998 |
| WO | WO 98/26342 | 6/1998 |
| WO | WO 98/30951 | 7/1998 |
| WO | WO 98/58308 | 12/1998 |
| WO | WO 98/58323 | 12/1998 |
| WO | WO 99/10872 | 3/1999 |

OTHER PUBLICATIONS

Bergamasco, "Design of Hand Force Feedback Systems for Glove-like Advanced Interfaces", IEEE, Sep. 1992, pp. 286-293.

Burdea, G.C., "Force And Touch Feedback For Virtual Reality," John Wiley and Sons, Inc., New York, New York, pp. 190-193 (1996).

Colgate et al., "Implementation of Stiff Virtual Walls in Force Reflecting Interfaces," IEEE Virtual Reality Annual International Symposium (Seattle, WA), pp. 202-208 (Sep. 18-22, 1993).

Decaudin, P., "Geometric Deformation by Merging a 3D-Object with a Simple Shape," Graphics Interface '96 Proceedings (Toronto, Canada), 6 pgs. (May 21-24, 1996).

Galyean, T.A., "Sculpting: An Interactive Volumetric Modeling Technique," Computer Graphics (SIGGRAPH '91 Las Vegas), vol. 25, No. 4, pp. 267-274 (Jul. 1991).

Hashimoto et al., "Dynamic Force Simulator for Force Feedback Human-Machine Interaction", IEEE, Sep. 1993, pp. 209-215.

Hirota et al., "Providing Force Feedback in Virtual Environments", IEEE, Sep. 1995, pp. 22-30.

Hirota et al., "Development of Surface Display," Proceedings of the Virtual Reality Annual International Symposium (Seattle), pp. 256-262 (Sep. 18-23, 1993).

Immersion Corp., "Impulse Engine 2000," http://www.immerse.com/WWWpages/IE2000pg.htm, 2 pgs. (1997).

Ishii et al., "A 3D Interface Device with Force Feedback: A Virtual Work Space for Pick-and-Place Tasks", IEEE, Sep. 1993, pp. 331-335.

Iwata, H., "Artificial Reality with Force-feedback: Development of Desktop Virtual Space with Compact Master Manipulator," Computer Graphics (SIGGRAPH '90 Dallas), vol. 24, No. 4, pp. 165-170 (Aug. 1990).

Kelley et al. "MagicMouse: Tactile and Kinesthetic Feedback in the Human-Computer Interface Using an Electromagnetically Actuated Input/Output Device," Department of Electrical Engineering, University of British Columbia, Vancouver, BC, V6T IZ4, Canada, Oct. 19, 1993, pp. 1-27.

Lewis, P.H., "Electronic Pen With Its Own Eraser", Personal Computers, Jul. 1995, p. C8.

Millman et al., "A System for the Implementation and Kinesthetic Display of Virtual Environments," Telemanipulator Technology, Proceedings of 1992 SPIE, vol. 1833, pp. 49-56 (1992).

Payne et al., "Distance Field Manipulation of Surface Models," IEEE Computer Graphics & Applications, pp. 65-71 (Jan. 1992).

Wang et al., "Volume Sculpting," 1995 Symposium on Interactive 3D Graphics (Monterey, CA), pp. 151-156 (1995).

Wilson R.K., "Many-Atom Molecular Dynamics with an Array Processor", Department of Chemistry, University of California—San Diego, La Jolla, 1977, pp. 147-169.

Wilson R.K., "Multiprocessor Molecular Mechanics", Departmetn of Chemistry, University of California, San Diego, La Jolla, 1975, pp. 17-52.

"3-D Animation Workshop," printed Jul. 29, 2003, http://webreference.com/3d/. Lessons 39, 64-68, and 72; 79 pgs.

Alejandre, "What is a Tessellation?", *The Math Forum, Drexel University*, printed Jul. 29, 2003, http://mathforum.org/sum95/suzanne/whattess.html, 4 pgs.

Altmann, "About Nonuniform Rational B-Splines—NURBS," Worcester Polytechnic Institute, printed Jul. 29, 2003, http://www.cs.wpi.edu/~matt/courses/cs563/talks/nurbs.html, 6 pgs.

Arraich, "Quick Mask," http://www.arraich.com/ref/aatool_quick_mask6.htm, 3 pgs.

Bentley, "Rendering Cubic Bezier Patches," Worcester Polytechnic Institute, printed Nov. 17, 2003, http://www.cs.wpi.edu/~matt/courses/cs563/talk/surface/bez_surf.html, 10 pgs.

Birn, "Tutorial: NURBS Head Modeling," printed Jul. 29, 2003, http://www.3drender.com/jbirn/ea/HeadModel.html, 5 pgs.

"Curves," *Avid Technology*, printed Nov. 06, 2003, http://www.iro.umontreal.ca/~roys/softimage/html/model/curves.html, chapter 10, 10 pgs.

Farin, "NURBS," printed Nov. 17, 2003, www.eros.cagd.eas.asu.edu/~farin/rbook/toc.html, 2 pgs.

Feldman, "Texture Mapping," http://www.geocities.com/SiliconValley/2151/tmap.html (22pgs.).

Fisher et al., "Pixel Values," http://www//dai.ed.ac.uk/HIPR2/value.htm (1pg.).

Foskey et al., "*ArtNova*: Touch-Enabled 3D Model Design," Proceedings of IEEE Virtual Reality 2002, Mar. 24-28, 2002, Orlando, Florida pp. 119-126.

"Fundamentals of NURBS Modeling," *Avid Technology*, printed Nov. 6, 2003, http://www.iro.umontreal.ca/~roys/softimage/html/model/nurbs_basics.html, chapter 9, 7 pgs.

Gu et al., "Global Conformal Surface Parameterization," Eurographics Symposium on Geometry Processing (2003), 12 pgs.

"How to use Postscript Art as a Stencil in Photoshop," *Swanson Tech Support, Photoshop Techniques* 004, 4 pgs.

Komerska et al., "Haptic Interface for Center-of-Workspace Interaction: Demonstration Paper," *Haptics Interfaces for Virtual Environments and Teleoperator Systems* (2002), pp. 352-353.

Komerska et al., "Haptic Task Constraints for 3D Interactions, "*Proceedings, IEEE Haptics Interfaces for Virtual Environments and Teleoperator Systems*, (Mar. 22-23, 2003), pp. 270-277.

Lenzmeier, "Color Depth and Color Spaces," http://www.csbsju.edu/itservices/teaching/c_space/colors.htm (3 pgs.).

"Lesson 12: Blur, Sharpen & Smudge," http://iit.bloomu.edu/vthc/Photoshop/enhancing/blurring.htm, 3 pgs.

"Lesson 14: Selection Tools," http://iit.bloomu.edu/vthc/Photoshop/BLENDING/selectiontools.htm, 7 pgs.

"Lesson 18: Opacity," http://iit.bloomu.edu/vthc/Photoshop/SpecialEffects/opacity.htm, 2 pgs.

"Lesson 22: Vector Shapes," http://iit.bloomu.edu/vthc/Photoshop/DRAWING/vectorshapes.htm (5 pgs.).

"Lesson 23: Gradients," http://iit.bloomu.edu/vthc/Photoshop/DRAWING/gradients.htm (7 pgs.).

"Lesson 19: Color Selection ," http://iit.bloomu.edu/vthc/Photoshop/DRAWING/colorpicker.htm (4 pgs.).

"Lesson 4: Layers," http://iit.bloomu.edu/vthc/Photoshop/Basics/layers.htm (2 pgs.).

"Lesson 7: Color Balance ," http://iit.bloomu.edu/vthc/Photoshop/enhancing/colorbalance.htm (3 pgs.).

"Lesson 8: Brightness & Contrast," http://iit.bloomu.edu/vthc/Photoshop/enhancing/brightness&contrast.htm (2 pgs.).

Miller et al., "The Design of 3D Haptic Widgets," Proceedings of the 1999 Symposium on Interactive 3D Graphics Conference Proceedings, (1999) pp. 1-6.

Nagel, "A Closer Look: Photoshop's New Paint Engine, p. 2 of 3," Mar. 7, 2002, http://www.creativemac.com/2002/03_mar/features/ps7dynamics1.htm (6pgs.).

Nagel, "A Closer Look: Photoshop's New Paint Engine, p. 3 of 3" Mar. 7, 2002, http://www.creativemac.com/2002/03_mar/features/ps7dynamics1.htm (5 pgs.).

Nagel, "A Closer Look: Photoshop's New Paint Engine," Mar. 7, 2002, http://www.creativemac.com/2002/03_mar/features/ps7dynamics1.htm (5 pgs.).

O'Rourke, "Comp.Graphics.Algorithms Frequently Asked Questions, Section 5. 3D Computations," htp://www.exaflop.org/docs/cgafaq/cga5.html (13 pgs.).

"Points, Nets, Patches . . . " printed Nov. 17, 2003, http://www.people.nnov.ru/fractal/splines/nets.htm, 2 pgs.

Porter et al., "Compositing Digital Images," Computer Graphics, vol. 18, No. 3, Jul. 1984, pgs. 253-259.

Powerful Photoshop Layers: Layer Effects Settings, http://www.webreference.com/graphics/column32/5.html (5 pgs.).

Raindrop Geomagic, Inc. product description for "Geomagic Shape," Oct. 3, 2003 printout, http://www.geomagic.com/products/shape, 2 pgs.

Raindrop Geomagic, Inc. product description for "Geomagic Shape," Nov. 26, 2003 printout, http://www.geomagic.com/products/shape, 2 pgs.

Raindrop Geomagic, Inc. product description for "Geomagic Studio," http://www.macdac.com/raindrop/studio.htm (4pgs.).

Rea, "Digital Photography and Electronic Imaging Glossary," Version 7.5.2 (Aug. 2000), 40 pgs.

Rogers, "An Introduction to NURBS," *Morgan Kaufmann Publishers*, (2000), pp. 1-4.

Sensable Technologies, "Feature Overview," Nov. 25, 2003 printout, http://www.sensable.com/products/3ddesign/freeform/overview.asp, 5 pgs.

Sensable Technologies,"Feature Overview: Emboss with Wrapped Image," Nov. 25, 2003 printout, http://www.sensable.com/products/3ddesign/freeform/emboss_with_wrap.asp, 1 pg.

Sensable Technologies, "Free Form Concept System," Jan. 20, 2004 printout, http://www.sensable.com/products/3ddesign/concept/index.asp, 2 pgs.

Sharman, "The Marching Cubes Algorithm," http://www.exaflop.org/docs/marchcubes/ind.html (6 pgs.).

Sorkine, et al, "Bounded-distortion Piecewise Mesh Parameterization," Proceedings of the Conference on Visualization 2002, Boston, Massachusetts, pgs. 355-362.

Surfaces, *Avid Technology*, printed Nov. 6, 2003, http://www.iro.umontreal.ca/~roys/softimage/html/model/surfs.html, chapter 11, 22 pgs.

"Tensor Production Spline Surfaces," printed Nov. 17, 2003, http://www.ibiblio.org/e-notes/Splines/Inter.htm, 3 pgs.

"Touch-Enabled 3D Model Design," Department of Computer Science, University of North Carolina at Chapel Hill (Feb. 2002), 2 pgs.

Weisstein, "Conformal Mapping," *Wolfram Research*, printed Nov. 11, 2003, http://mathworld.wolfram.com/ConformalMapping.html, 7 pgs.

Adachi, Y., "Touch and Trace on the Free-Form Surface of Virtual Object," Proceedings of IEEE Virtual Reality Annual International Symposium, Sep. 18-22, 1993, Seattle WA, pp. 162-168.

Agrawala, M. et al "3D Painting on Scanned Surfaces", Stanford University, 1995, pp. 145-150.

Atkinson, W.D. et al., "Computing with Feeling" Comput. & Graphics, vol. 2, 1977, pp. 97-103.

Barr, Alan H.: "Global and Local Deformations of Solid Primitives"; Computer Graphics; vol. 18, No. 3, pp. 21-30 (Jul. 1984).

Blinn, J.F., "Simulation of Wrinkled Surfaces," Computer Graphics, vol. 12-3, Aug. 1978, pp. 286-292.

Brooks, F. P. et al., "Project GROPE—Haptic Displays for Scientific Visualization," Computer Graphics, vol. 24, No. 4, Aug. 1990, pp. 177-185.

Colgate, J. E. et al., "Factors Affecting the Z-Width of a Haptic Display," published by IEEE Computer Society Press, Los Alamitos, California, in Proceedings: 1994 IEEE International Conference On Robotics and Automation, held May 8-13, 1994 in San Diego, California, vol. 4, 1994, pp. 3205-3210.

Colgate, J. E. et al., "Issues in the Haptic Display of Tool Use," published by IEEE Computer Society Press, Los Alamitos, California, in Proceedings: 1995 IEEE/RSJ International Conference on Intelligent Robots and Systems—Human Robot Interaction and Cooperative Robots, held Aug. 5-9, 1995 in Pittsburgh, Pennsylvania, 1995, pp. 140-145.

Dworkin, P. et al., "A New Model for Efficient Dynamic," Fourth Eurographics Animation and Simulation Workshop Proceedings Eurographics Technical Report Series, ISSN 1017-4656, Sep. 4-5, 1993, pp. 135-147.

Inoue H.et al., "Parallel Manipulator," Proceedings of 3rd Robotics Research: The Third International Symposium, Faugeras & Giralt, eds., MIT Press 1986.

Iwata H., "Pen-based Haptic Virtual Environment," Proceedings of IEEE Virtual Reality Annual Internatioanl Symposium, (Sep. 18-22, 1993, Seattle, WA), pp. 287-292.

Hirata, Y. et al. ,"3-Dimensional Interface Device for Virtual Work Space," Proceedings of the 1992 IEEE, Jul. 7-10, 1992, pp. 889-896.

Howe, R.D. et al., "Task Performance with a Dextrous Teleoperated Hand System," Telemanipulator Technology, Nov. 1992, Proceedings of SPIE, vol. 1833, pp. 1-9.

Immersion Corporation Website, Immersion Corporation, 1997, 4 pgs. (not admitted as prior art).

Immersion Corporation, "Laparoscopic Impulse Engine□: A New Force Feedback Surgical Simulation Tool", Immersion Corporation, 1995.

Immersion Corporation, "Virtual Laparoscopic Interface", Immersion Corporation, 1995, 1 pg.

Immersion Corporation, "The Impulse Engine™", Immersion Corporation, 1996.

Kotoku, T., et al., "A Force Display Algorithm for Virtual Environments," SICE, pp. 347-355, 1992.

Kraft Telerobotics, Inc., "GRIPS Force Feedback Manipulator System," Kraft Telerobotics, Inc. (date unknown) 4 pgs.

Kraft Telerobotics, Inc., "GRIPS Master/Slave Manipulator System," Kraft Telerobotics, Inc., 1988.

Kraft Ocean Systems, "Grips Underwater Manipulator System", 4 pgs. (date unknown).

Marcus. B.A., et al., "EXOS Research on Master Controllers for Robotic Devices," Fifth Annual Workshop on Space Operations Applications and Research (SOAR '91) pp. 238-245, Jul. 1991.

Massie, T. H., "Design of a Three Degree of Freedom Force-Reflecting Haptic Interface", Massachusetts Institute of Technology; Bachelor of Science in Electrical Science and Engineering Thesis, May 1993, pgs. 1-38.

Massie, T. H., "Initial Haptic Explorations with the Phantom: Virtual Touch Through Point Interaction", Massachusetts Institute of Technology Master of Science Thesis, Feb. 1996, pp. 1-49, (not admitted as prior art).

McAffee et al., "Teleoperator Subsystem/Telerobot Demonstrator," Force Reflecting Hand Controller Equipment Manual, Jet Propulsion Laboratory, Jan. 1988.

Minsky et al., "Feeling and Seeing: Issues in Force Display," Computer Graphics, vol. 24, No. 2, Mar. 1990, pp. 235-270.

Minsky, M., "Computational Haptics: The Sandpaper System for Synthesizing Texture for a Force-Feedback Display," Massachusetts Institute of Technology Ph.D. Thesis, Jun. 1995, pp. 1-217.

Morgenbesser, H. B., "Force Shading for Shape Perception in Haptic Virtual Environments", Massachusetts Institute of Technology Master of Engineering Thesis, Sep. 1995, pp. 1-77.

Salcudean S. E. et al., "On the Emulation of Stiff Walls and Static Friction with a Magnetically Levitated Input/Output Device," Dynamic Systems and Control: vol. 1, DSC-vol. 55-1, 1994, pp. 303-309.

Salisbury, K. et al., "Haptic Rendering: Programming Touch Interaction with Virtual Objects," Presented and disseminated at the 1995 Symposium on Interactive 3D Graphics held Apr. 9-12, 1995 in Monterey, CA, sponsored by the Association for Computing Machinery (ACM) and published by the ACM in Proceedings: 1995 Symposium on Interactive 3D Graphics, Monterey, California, Apr. 9-12, 1995, pp. 123-130.

Shimoga, K. B., "A Survey of Perceptual Feedback Issues in Dextrous Telemanipulation: Part I. Finger Force Feedback" published by IEEE Neural Networks Council in IEEE Virtual Reality Annual International Symposium, held Sep. 18-22, 1993 in Seattle, Washington, pp. 263-270.

Snow, E. et al., "Compact Force-Reflecting Hand Controller," NASA Tech Brief, vol. 15, No. 4 from Jet Propulsion Laboratory Report NPO-17851-7348, Apr. 1991, pp. i, 1-3, 1a-11a, 14a, 15a.

Sutter, P.H., J. C. Iatridis and N. V. Thakor, "Response to Reflected-Force Feefback to Fingers in Teleoperations," Proc. of the NASA Conf. on Space Telerobotics, pp. 65-74, NASA JPL, Jan. 1989.

Swarup, N., "Haptic Interaction with Deformable Objects Using Real-Time Dynamic Simulation", Massachusetts Institute of Technology, Sep. 1995, pp. 1-83.

Tanie, K., et al., "Force Display Algorithms", 1993 IEEE International Conference on Robotics and Automation, May 2-7, 1993, Atlanta Georgia, USA, 1993, pp. 60-78.

Wang, S.W. and Kaufman, A.E., "Volume Sculpting", 1995 Symposium on Interactive 3D Graphics. Monterey, California, pp. 151-156.

Terzopoulos, D. et al.; "Elastically Deformable Models"; Computer Graphics, vol. 21, No. 4, pp. 205-214 (Jul. 1987).

Yoshikawa, T. et al., "Construction of Virtual World Using Dynamics Modules and Interaction Modules," Proceedings of the 1996 IEEE International Conference on Robotics and Automation (Minneaoplis, MN), pp. 2358-2364 (Apr. 1996).

Zilles, C. B. et al., "A Constraint-Based God-object Method for Haptic Display," published by IEEE Computer Society Press, Los Alamitos, California, in Proceedings of the 1995 IEEE/RSJ International Conference on Intelligent Robots and Systems—Human Robot Interaction and Cooperative Robots, held Aug. 5-9, 1995 in Pittsburgh, Pennsylvania, 1995, pp. 146-151.

Elhajj et al., "Supermedia-Enhanced Internet-Based Telerobotics," Proceedings of the IEEE, vol. 91, No. 3, pp. 396-421 (Mar. 2003).

Luo et al., "Networked Intelligent Robots Through the Internet: Issues an Opportunities," Proceedings of the IEEE, vol. 91, No. 3, pp. 371-382 (March 2003).

Oboe, "Force-Reflecting Teleoperation Over the Internet: The JBIT Project," Proceedings of the IEEE, vol. 91, No. 3, pp. 449-462 (Mar. 2003).

Safaric et al., "Control of Robot Arm with Virtual Environment via the Internet," Proceedings of the IEEE, vol. 91, No. 3, pp. 422-429 (Mar. 2003).

Tan et al., "Virtual Environments for Internet-Based Robots—I: Modeling a Dynamic Environment," Proceedings of the IEEE, vol. 91, No. 3, pp. 383-388 (Mar. 2003).

Tan et al., "Virtual Environments for Internet-Based Robots—II: Path Planning," Proceedings of the IEEE, vol. 91, No. 3, pp. 389-395 (Mar. 2003).

Zilles, "Haptic Rendering with the Toolhandle Haptic Interface," Massachusetts Institute of Technology Master of Science Thesis, May 1995, pp. 1-46.

Gibson, "Beyond Volume Rendering: Visualization, Haptic Exploration, and Physical Modeling of Voxel-based Objects," 1995, Mitsubishi Electric Research Laboratories, Inc., Technical Report Apr. 1995, 6th Eurographics Workshop on Visualization in Scientific Computing, pp. 1-14 (1995).

* cited by examiner

METHOD AND APPARATUS FOR DETERMINING FORCES TO BE APPLIED TO A USER THROUGH A HAPTIC INTERFACE

CROSS REFERENCE TO RELATED APPLICATION

This application is a continuation of U.S. Ser. No. 09/324,137, filed Jun. 2, 1999, issued as U.S. Pat. No. 6,369,834, which is a continuation of U.S. Ser. No. 08/627,432, filed Apr. 4, 1996, now U.S. Pat. No. 6,111,577, issued Aug. 29, 2000, to Zilles et al., the entire disclosure of each of which is hereby incorporated by reference.

FIELD OF THE INVENTION

The invention relates generally to a method and apparatus for determining forces to be applied to a user interacting with virtual objects in a virtual reality computer environment and more specifically to a method and apparatus for determining forces to be applied to a user through a haptic interface.

BACKGROUND OF THE INVENTION

Virtual reality (VR) computer systems generate simulated environments called "virtual environments" for interaction with a user. The virtual environments include virtual representations of objects which the user can manipulate through an input device. Conventional VR systems attempt to simulate the visual, audio and touch sensory information which would be accessible to a user in the real world environment when interacting with physical objects. These VR systems also attempt to give the user the control over objects that the user would have in the real world environment.

VR system applications include video games, engineering tools and training tools. VR systems have been used to replicate situations which would be too costly or too dangerous to create otherwise. One example of a VR system which is used as a training tool is a flight simulator. Flight simulators replicate cockpits of airplanes and are used to train pilots without subjecting the pilots to the danger of actual flight.

The more sophisticated VR systems include a haptic interface system. A haptic interface system allows a human "observer" to explore and interact with a virtual environment using the sense of touch. The major goal of a haptic interface system is to provide the sensations a user would experience if the user were to touch a virtual environment. Haptic interface systems replicate the forces felt by humans when interacting with real objects.

The two different forms of human haptic perception that haptic interface systems attempt to replicate are tactile and kinesthetic. The human tactile system consists of nerve endings in the skin which respond to pressure, warmth, cold, pain, vibration and itch. The tactile system allows humans to sense local geometry, rough texture, and thermal properties from static contact. The kinesthetic system refers to the collection of receptors in the muscles, tendons, and joints which allow perception of the motion and forces upon a human's limbs. In order to accurately replicate the forces experienced by humans in the real world, haptic interface systems attempt to model the shape, surface compliance and texture of objects.

Haptic interface systems include three main components: a haptic interface device, a model of the environment to be touched, and a haptic rendering application. A haptic interface device is a tactile or force-feedback device used by a human which provides the touch sensations of interacting with virtual objects. Known haptic interface devices consist of an electromechanical linkage which can exert a controllable force on a human's hand. The model of the environment is a computer generated representation of the real world environment. The haptic rendering application determines the forces to be applied to the user based on the model environment.

One known haptic interface system reduces the user's interactions with the virtual environment to those of a point interacting with three dimensional objects. The haptic rendering application used in this known system utilizes vector field methods to determine the force to be applied to the user. Vector field methods are a classification for any method that can determine the feedback force to be applied to a user by knowing only the location of the haptic interface point. As used herein, a "haptic interface point" is defined as the endpoint location of the physical haptic interface as sensed by the encoders of the VR system. The haptic interface point represents the location of the user in the virtual environment. Vector field methods however, do not accurately replicate the touch sensations a user would experience for many objects in the real world. Users using a haptic interface system which utilizes a vector field method may experience force discontinuities when traversing the volume boundaries of the virtual objects.

Further, vector field methods also do not accurately model thin objects. Due to the limited servo and mechanical stiffnesses, the haptic interface point must travel somewhat into the object before enough force can be applied to the user to make the object feel "solid." When this distance becomes greater than the thickness of an object, the vector field method produces unrealistic sensations. For example, when the haptic interface point penetrates more than halfway through a thin object, rather than exerting a force to push back against the user, the force vector changes direction and applies a force which pushes the user out the side of the object opposite to the side that the user entered. Vector field methods also cannot determine the appropriate forces to apply when the model of the environment overlaps simple objects to create more complex objects.

What is desired then is a haptic interface system which provides touch interfaces which accurately replicate the touch sensations a user would experience in the real world. The present invention permits such functionality.

SUMMARY OF THE INVENTION

The invention relates to a method for determining the forces to be applied to a user through a haptic interface. The method includes the steps of generating a representation of an object in graphic space, sensing the position of a user in real space, determining the user's haptic interface in graphic space, determining the user's fiducial object in graphic space and determining a force to be applied to the user in real space. In one embodiment the method calculates a stiffness force to be applied to the user. In other embodiments, the method calculates damping and friction forces to be applied to the user.

In one embodiment, the step of generating a representation of an object in graphic space includes defining the object as a mesh of planar surfaces and associating surface condition values to each of the nodes defining the planar surfaces. In another embodiment, the step of generating a representation of an object in graphic space includes describing the surface of the object using a coordinate system and associating surface condition values with each set of coordinates.

The invention also relates to an apparatus for determining the forces to be applied to a user through a haptic interface. The apparatus includes a position sensor, a processor executing an algorithm to determine the forces to be applied to a user in real space, a display processor and a force actuator. In one embodiment, the algorithm determining the forces to be applied to the user includes a module generating a representation of an object in graphic space, a module determining the user's haptic interface in graphic space, a module determining the user's fiducial object in graphic space and a module calculating the force to be applied to the user in real space.

The present invention has the technical advantage of accurately replicating the touch sensations a user would experience when interacting with real world objects. The present invention has the further advantage of accurately modeling the forces applied to a user by thin and arbitrarily shaped polyhedral objects. The present invention has yet the further advantage of determining the appropriate forces to be applied to a user by a complex virtual object formed from overlapped simple virtual objects.

BRIEF DESCRIPTION OF THE DRAWINGS

Like reference characters in the respective drawn figures indicate corresponding parts.

DETAILED DESCRIPTION OF THE INVENTION

Figure 1:
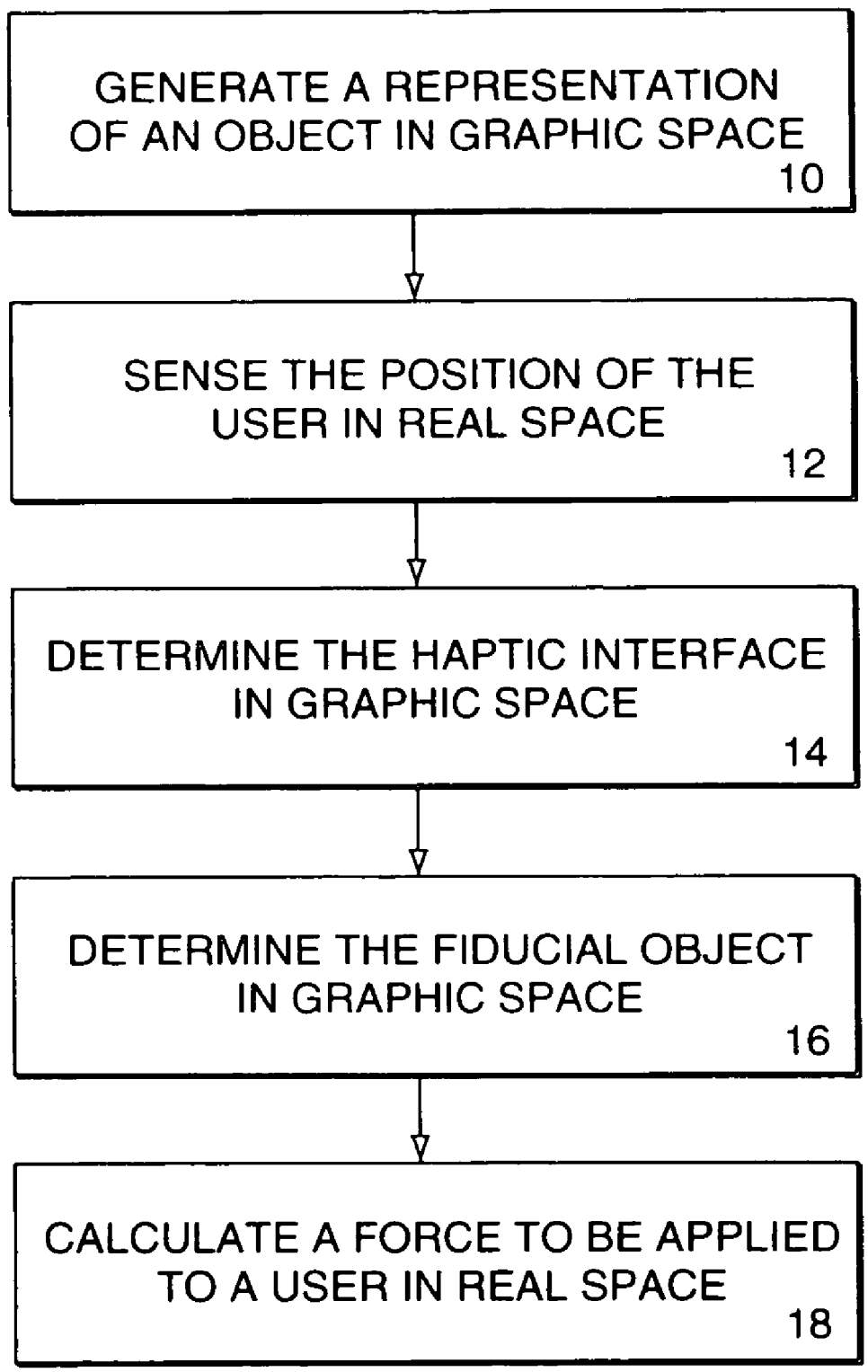
FIG. 1 is a flowchart representation of an embodiment of a process for determining a force to be applied to a user through a haptic interface.

In brief overview, and referring to FIG. 1, a flowchart shows the steps performed by one embodiment of the method of the present invention for determining the forces to be applied to a user through a haptic interface device. In step 10, the haptic rendering application generates a representation of a real world object in graphic space. As used herein, "rendering" is defined as the creation oil an image in graphic space. "Haptic rendering application" refers to the application which generates the representation of the real world object and determines the forces to be applied to the user through the haptic interface. As used herein, "graphic space" is defined as the computer generated virtual environment with which the user can interact. In one embodiment, the haptic rendering application uses mathematical models to create the representation of the object. In another embodiment, a separate application is used to create the representation of the object. For example, in one embodiment, a Computer-aided design (CAD) software application is used to generate the representation of the object. The real world objects capable of being represented include planar surfaces, curved surfaces and arbitrarily shaped polyhedral objects. The real world objects may also include concave, convex and curved portions. As used herein, "virtual object" is defined as the representation of the real world object in graphic space.

In step 12, the sensors of the haptic interface system sense the position of the user in real space. As used herein, "real space" is defined as the real world environment. In step 14, the haptic rendering application utilizes the information obtained by the sensors to determine the haptic interface in graphic space. The location of the haptic interface describes the position of the user in the virtual environment. In step 16, the haptic rendering application determines the fiducial object in graphic space. The fiducial object is the "virtual" location of the haptic interface. The fiducial object location represents the location in graphic space at which the haptic interface would be located if the haptic interface could be prevented from penetrating the virtual objects. The fiducial object does not penetrate the surfaces of the virtual objects. When the haptic interface does not penetrate the surface of a virtual object, the haptic interface and the fiducial object coincide. When the haptic interface penetrates the surface of the virtual object, the fiducial object remains located on the surface of the virtual object. The purpose of the fiducial object ramaining on the surface is to provide a reference to the location on the surface of the virtual object where haptic interface would be if the haptic interface could be prevented from penetrating surfaces. It is important to know the location of the fiducial object in order to accurately determine the forces to be applied to the user. The method used to determine the fiducial object will be described in more detail below.

After the haptic rendering application determines both the haptic interface and the fiducial object, in step 18, the application calculates a force to be applied to the user in real space through the haptic interface device. After the haptic rendering application has calculated the force to be applied to the user, this force may be generated and applied to the user through a haptic interface device.

In the preferred embodiment of the method of the present invention, the haptic rendering application prevents the fiducial object from penetrating the surface of any of the virtual objects in the virtual environment. In this embodiment, the fiducial object is placed where the haptic interface would be if the haptic interface and the virtual object were infinitely stiff. Forcing the fiducial object to remain on the surface of the virtual object allows for a more realistic generation of the forces arising from interacting with the virtual object. Unlike in the vector field methods, the direction of the force to be applied to the user in real space is unambiguous. The user is not "pulled" through an object when the user should continue to be "pushed" away from the object. The method of the present invention is therefore suitable for thin objects and arbitrarily shaped polyhedral objects.

In yet another embodiments, the haptic rendering algorithm forces the fiducial object to follow the laws of physics in the virtual environment. This allows for an even more realistic simulation of the real world environment.

Figure 2:
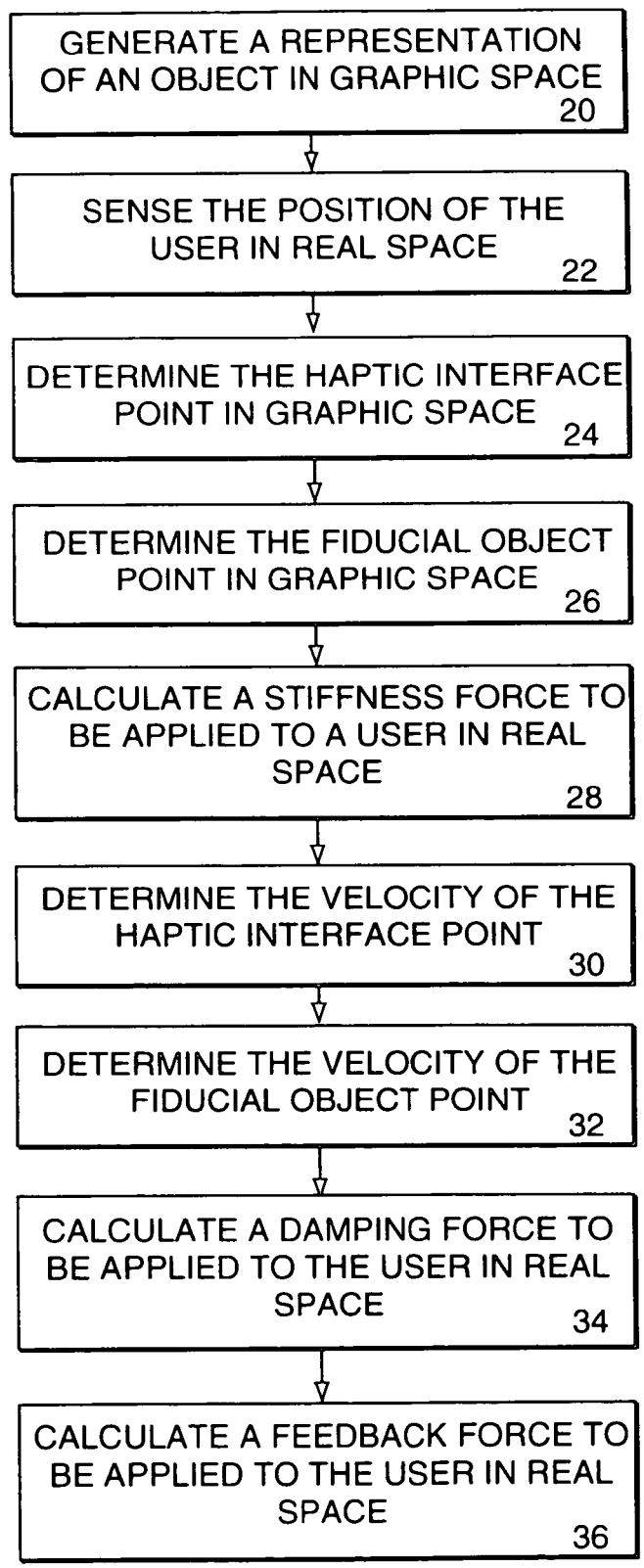
FIG. 2 is a flowchart representation of an embodiment of a process for determining a feedback force to be applied to a user through a haptic interface.

In more detail and referring now to FIG. 2, a flowchart illustrates a more detailed sequence of steps performed by one embodiment of the present invention to determine a feedback force to be applied to a user in real space through a haptic interface. In the embodiment illustrated by the flowchart of FIG. 2, the user's interactions with the virtual environment are reduced to those of a point interacting with three dimensional objects. In other embodiments, the user's interactions are not reduced to those of a point interacting with three dimensional objects. In other embodiments, the haptic interface and the fiducial object may be a series of points. In still other embodiments, the haptic interface and fiducial object may be three-dimensional objects.

In step 20, the haptic rendering application generates a representation of a real world object in graphic space. As described above, this representation is termed the virtual object. The real world objects modeled by the method of the present invention may have concave portions as well as convex portions. Many different methods can be used to generate the virtual object. In one embodiment, the haptic rendering application defines the real world object as a mesh of planar surfaces. In one embodiment utilizing the mesh of planar surfaces method, each of the planar surfaces comprising the mesh has the same number of sides and the same number of nodes. In another embodiment, the planar surfaces comprising the mesh have varying numbers of sides and nodes. In the preferred embodiment, each of the planar surfaces is triangular and has three nodes. In another embodiment, the haptic rendering application defines the real world object as an n-noded polygon. In still another embodiment, the haptic rendering application describes the real world object using a coordinate system. In yet another embodiment, the representation of the object is displayed on a display.

Figure 3:
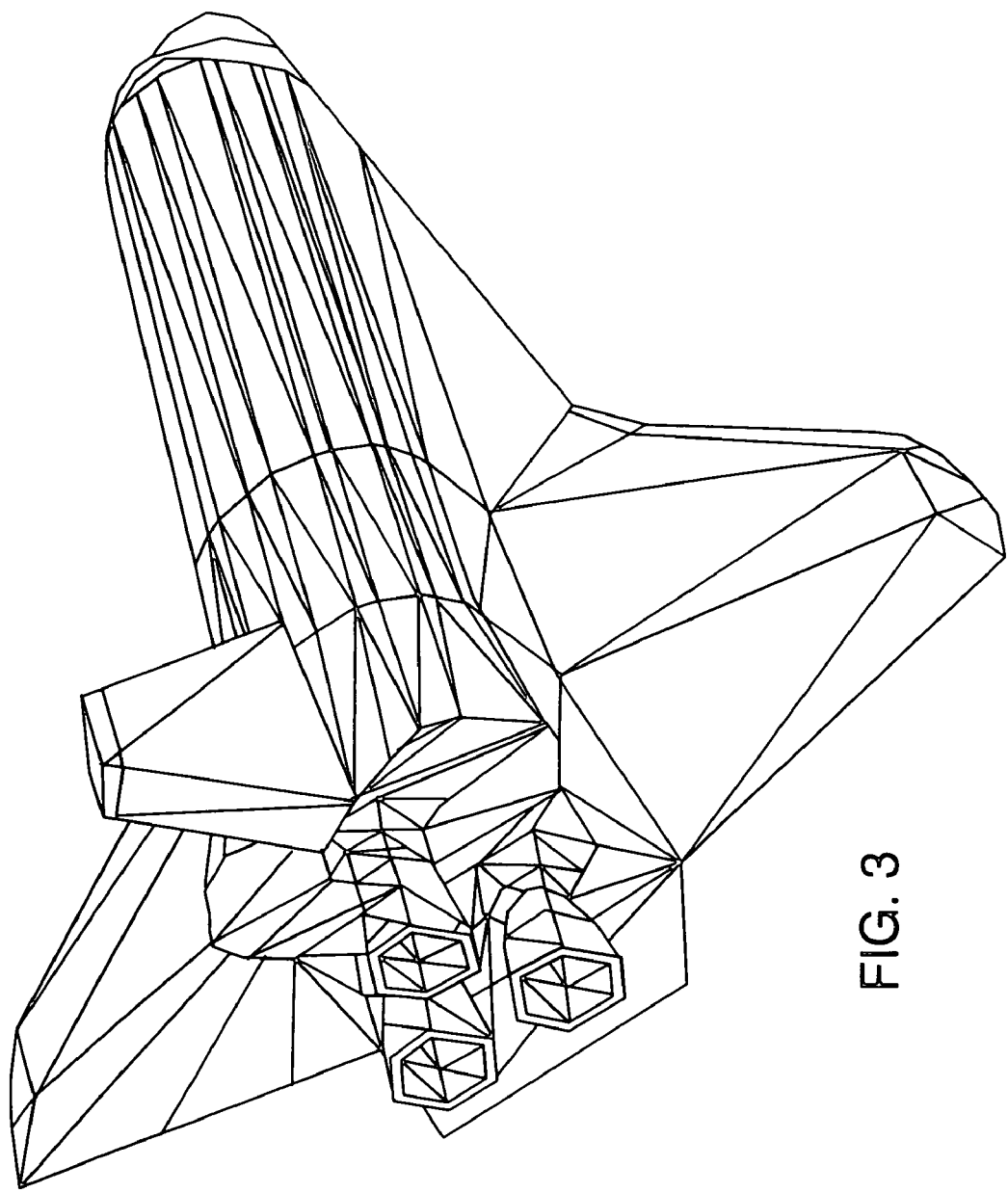
FIG. 3 is a pictorial view of a representation of a real world object in graphic space.

FIG. 3 shows an example of a representation of a real world object which has been generated by one embodiment of the present invention. The real world object depicted in FIG. 3 is a space shuttle. The representation consists of 616 polygons. In one embodiment, the representation is generated from a standard object file format such as AutoCad's DXF or WAVEFRONT's OBJ.

Referring again to FIG. 2, once the haptic rendering application has generated a representation of an object in graphic space, in step 22 the haptic interface device senses the position of the user in real space. In another embodiment, the haptic interface device senses the position of the user simultaneously with the haptic rendering application generating the representation of the object in graphic space. The haptic interface device may utilize any of the devices known in the art for sensing the position of an object.

After the haptic interface device has sensed the position of the user in real space, the information regarding the position of the user is relayed to the haptic rendering application. In step 24, the haptic rendering application uses the position of the user in real space to determine the location of the haptic interface point in graphic space. When the user changes position, the haptic interface device senses this change in position and the haptic rendering application updates the location of the haptic interface point in graphic space to reflect the change of the user's position in real space.

Once the haptic rendering application determines the haptic interface point location, it uses the haptic interface point location to determine the location of the fiducial object point in graphic space as illustrated by step 26. As discussed above, if the haptic interface point does not penetrate a virtual object, the haptic interface point and the fiducial object point are collocated. As the haptic interface point penetrates the surface of a virtual object, the fiducial object remains on the surface of the virtual object. The haptic rendering application computes the fiducial object point location to be a point on the currently contacted virtual object surface such that the distance of the fiducial object point from the haptic interface point is minimized. The method used by the haptic rendering application to calculate the location of the fiducial object will be discussed in more detail below.

In one embodiment, the location of the fiducial object point relative to the representation of the object is displayed on a display along with the representation of the object. When the position of the fiducial object changes, the display reflects this change in position.

Once the haptic rendering application has determined the locations of the haptic interface point and the fiducial object point, in step 28 the haptic rendering application calculates the stiffness force component of the feedback force to be applied to a user in real space through the haptic interface. The stiffness force represents the force that would be applied to the user in the real world by a real world object due to the stiffness of the surface of the object. Simple impedance control techniques can be used to calculate the stiffness force to be applied. In one embodiment, the haptic rendering application uses Hooke's law to calculate the stiffness force as illustrated by equation (1) below, wherein k is the stiffness of the virtual object's surface.

$$F_{stiffness} = k(x_{fiducial-object} - x_{haptic-interface}) \quad (1)$$

In equation (1), $F_{stiffness}$ represents the stiffness force to be applied to the user through the haptic interface, $x_{fiducial-object}$ represents the position of the fiducial object in graphic space, $x_{haptic-interface}$ represents the position of the haptic interface in graphic space and k represents the stiffness of the virtual object's surface. As shown by equation (1), to calculate the stiffness force, the haptic rendering application first calculates the displacement between the fiducial object point location and the haptic interface point location, represented in equation (1) by $(x_{fiducial-object} - x_{haptic-interface})$. The haptic rendering application then multiplies this displacement by the stiffness of the virtual object's surface, k.

After determining the locations of the haptic interface point and the fiducial object point, the haptic rendering application stores state variables representing these locations for later use in calculating the forces to be applied to the user. The purpose of storing information relating to these locations is to enable the haptic rendering application to compute the forces to be applied to the user based on the history of the user's motions.

In order to accurately model the forces that would be exerted on a user in the real world, in one embodiment, the haptic interface application adds a damping force to the stiffness force calculated in step 28. The combination of a stiffness force and a damping force provides a more accurate model of the local material properties of the surface of an object.

To obtain the necessary information, the haptic rendering application next determines the velocity of the haptic interface point in step 30 and determines the velocity of the fiducial object point in step 32. In one embodiment, the haptic rendering application determines the velocities of the haptic interface point and the fiducial object point relative to a common reference. The common reference may be a virtual object or simply a point in the virtual environment. In another embodiment, the haptic rendering application determines the velocity of the fiducial object point relative to the haptic interface point. After the haptic rendering application has determined the velocities of the haptic interface point and the fiducial object point in steps 30 and 32, it calculates a damping force to be applied to the user in real space as illustrated by step 34.

In one embodiment of the method of the present invention, the damping force ($F_{damping}$) is based on the motion of the haptic interface point ($\dot{x}_{haptic-interface}$) relative to the motion of the fiducial object point ($\dot{x}_{fiducial-object}$). In another embodiment, only motion in a direction normal ($\hat{N}$) to the surface of the virtual object is used to calculate the damping force so that motion of the user tangential to the surface of the virtual object is not impeded. In one embodiment, the haptic rendering application computes the damping force according to equation (2) in which c is the damping coefficient and $\hat{N}$ represents the vector normal to the surface of the virtual object.

$$F_{damping} = c((\dot{x}_{fiducial-object} - \dot{x}_{haptic-interface}) \cdot \hat{N})\hat{N} \quad (2)$$

In one embodiment, the haptic rendering system only applies a damping force to the user when the calculated damping force has the effect of stiffening the virtual object's surface. The purpose of only applying a damping force which has the effect of stiffening the surface is to avoid the surface having the effect of resisting the withdrawal of the haptic interface from the surface. This embodiment would not exert a force against the user that would inhibit the user from moving away from the virtual object's surface. Otherwise, the damping force would make the object feel sticky to the user.

Once the haptic rendering application calculates the stiffness and damping forces to be applied to the user in real space, in step 36 the haptic rendering application calculates a feedback force ($F_{feedback}$) to be applied to the user by summing the stiffness ($F_{stiffness}$) and damping ($F_{damping}$) forces as shown by equation (3) below.

$$F_{feedback} = F_{stiffnes} + F_{damping} \quad (3)$$

As described above in the discussion of FIG. 3, one embodiment of the method of the present invention generates the representation of the real world object in graphic space by describing the object as a mesh of planar surfaces. Simulating real world objects using surfaces provides an accurate model for the user to interact with because in the real world humans interact with objects on the objects' surfaces. Also as discussed above, one embodiment of the method of the present invention generates the representation of the real world object by defining the object as a mesh of triangular planar surfaces. This embodiment uses a mesh of triangular elements because this representation is the most fundamental, and assures that all of the nodes of each surface are coplanar. Because graphic models do not require the exactness required by haptic models, it is not uncommon to find graphic representations of objects with four-noded surfaces where the four nodes are not coplanar. When the nodes are not coplanar, the fiducial object point may slide between two surfaces and no longer remain on the surface of the virtual object. This would cause the haptic rendering application to calculate incorrect forces to be applied to the user. The problems caused by such surfaces can be avoided by using a triangular mesh. In addition, since three points define a plane, the nodes defining the virtual object can be moved at any time and the object will still be composed of surfaces that are geometrically acceptable for calculating forces according to the method of the present invention.

Another embodiment of the invention takes advantage of this ability to move nodes to implement representations of objects having deformable surfaces. This embodiment simulates deformable surfaces by moving the nodes defining the virtual object in response to forces applied to the deformable surfaces by the user.

Figure 4A:
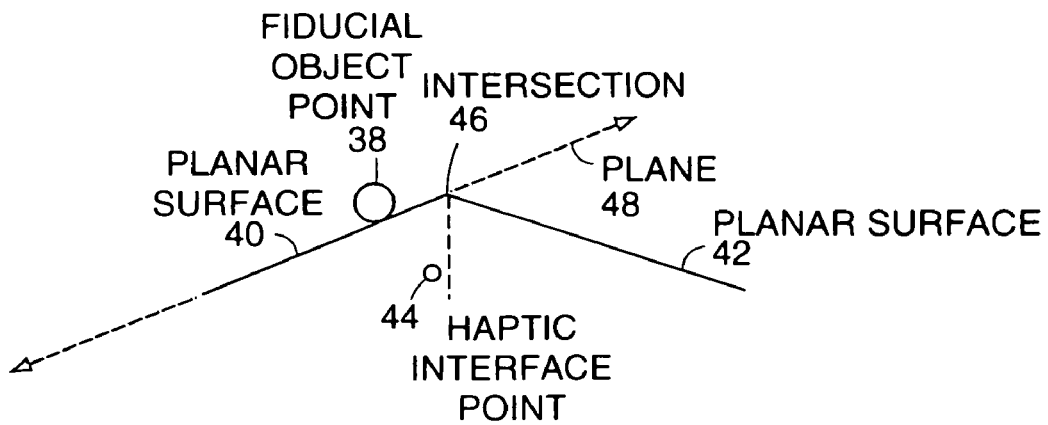
FIG. 4A is a pictorial view of a convex portion of a virtual object formed by two planar surfaces and a fiducial object located on one of the surfaces.
Figure 4B:
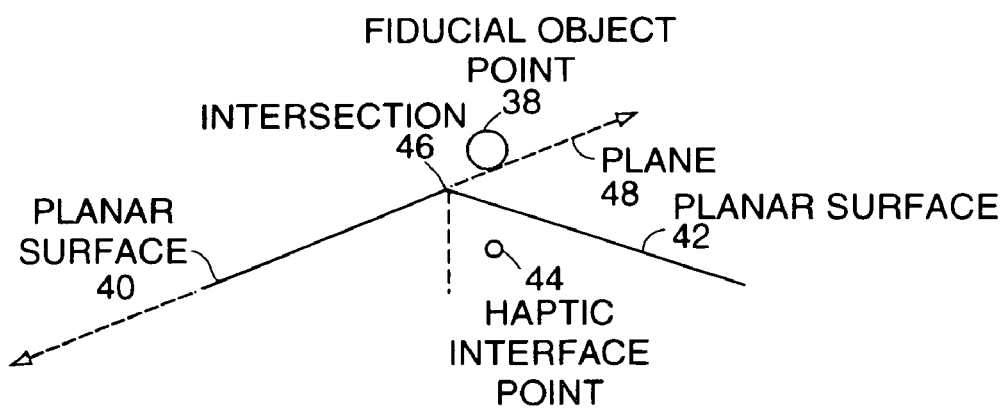
FIG. 4B is a pictorial view of the two planar surfaces of FIG. 4A and the fiducial object of FIG. 4A transitioning between the two planar surfaces.
Figure 4C:
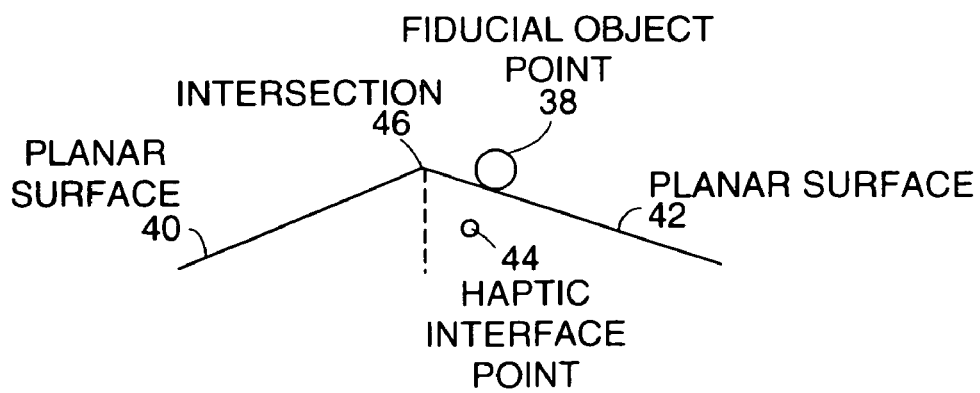
FIG. 4C is a pictorial view of the two planar surfaces of FIG. 4A and the fiducial object of FIG. 4A after the fiducial object has transitioned between the surfaces.

FIGS. 4A–4C illustrate the steps performed by one embodiment of a haptic rendering application to move a fiducial object point 38 between two planar surfaces, 40 and 42 respectively, joined to form a convex surface, when the haptic interface point 44 moves past the intersection 46 of the two planar surfaces 40 and 42. The two planar surfaces 40 and 42 act as constraints on the motion of the fiducial object point 38. That is, the fiducial object point 38 can not penetrate the surfaces 40 and 42. In order to determine the new location of the fiducial object point 38 in response to a change in location of the haptic interface point 44, one embodiment of the method of the present invention first determines the active constraints on the motion of the fiducial object point 38. For infinite planar surfaces, the haptic rendering application of this embodiment defines the planar surface as an active constraint if the fiducial object point 38 is located a positive distance from the planar surface 40 or 42 and the haptic interface point 44 is located a negative distance from the planar surface 40 or 42. The distance is positive if the point is located in the direction of the surface normal pointing outward from the surface of the virtual object. The distance is negative if the point is located in the direction of the surface normal pointing inward from the surface of the virtual object. Using this definition of an active constraint causes the virtual surfaces 40 and 42 to act as one-way constraints to penetration. That is, the surfaces 40 and 42 only prevent the fiducial object point 38 from entering the surfaces 40 and 42.

For surfaces that are not of infinite extent, in addition to the requirements for infinite planar surfaces, to be defined as an active constraint the haptic rendering application requires that the contact of the fiducial object point 38 with the plane containing the surface take place within the boundaries of the planar surface. In order to determine whether the contact of the fiducial object point 38 takes place within the boundaries of the planar surface, in one embodiment the haptic rendering application determines the line intersecting the current haptic interface point 44 and the old fiducial object point 38 which the haptic rendering application is updating. If this line passes though the planar surface within the boundaries of the surface, then the haptic rendering application defines the surface as active.

FIGS. 4A–4C show two surfaces, 40 and 42 respectively, of a convex portion of a virtual object. In the embodiment wherein the user's interactions with the virtual environment are reduced to those of a point interacting with three dimensional objects, when a user interacts with convex portions of objects, only one surface of the virtual object is an active constraint at a time. To transition the fiducial object point 38 between two surfaces sharing a convex edge requires two steps. In FIG. 4A, surface 40 is an active constraint because the fiducial object point 38 is located a positive distance from the surface 40, the haptic interface point 44 is located a negative distance from the surface 40 and the fiducial object point 38 is located within the boundaries of the surface 40. While surface 40 remains an active constraint, the fiducial object point 38 remains on the plane 48 containing the surface 40, but not does not necessarily remain within the physical boundaries of surface 40.

FIG. 4B illustrates the first step performed by the haptic rendering application to transition the fiducial object point 38 to the surface 42. In the first step, the haptic rendering application moves the fiducial object point 38 over the second surface 42, but the fiducial object point 38 remains in the plane 48 of the first surface 40. In the second step, the haptic rendering application no longer considers the first surface 40 an active constraint because the fiducial object point 38 is not located within the physical boundaries of the surface 40. The haptic rendering application then moves the fiducial object point 38 onto the second surface 42 as illustrated in FIG. 4C. In other embodiments wherein the user's interactions with the virtual environment are not reduced to those of a point interacting with three dimensional objects, more than one surface of a convex portion of a virtual object may be an active constraint at a time.

Figure 5A:
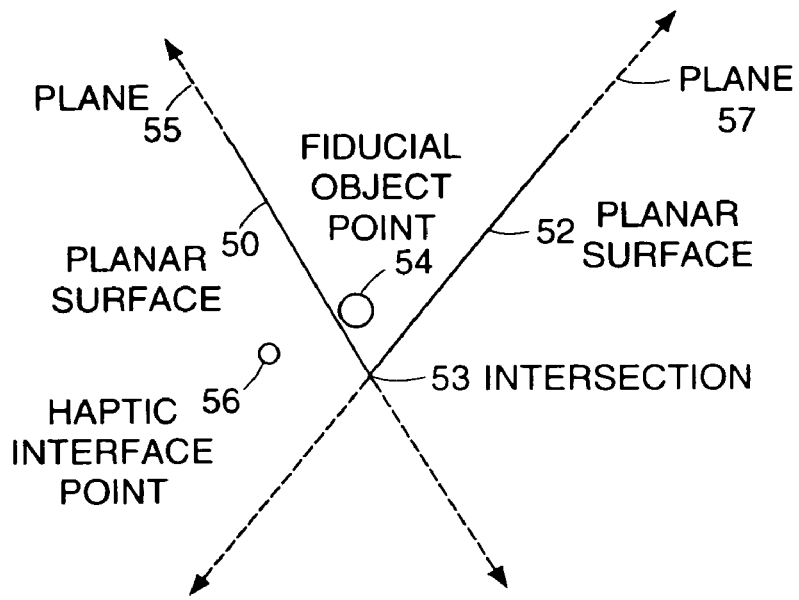
FIG. 5A is a pictorial view of a concave portion of a virtual object formed by two planar surfaces and a fiducial object located on one of the surfaces.
Figure 5B:
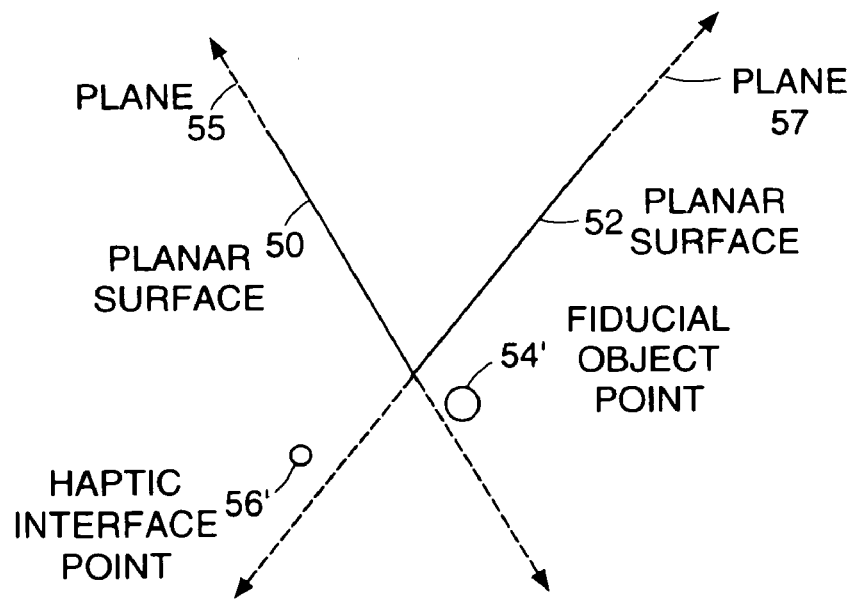
FIG. 5B is a pictorial view of the two planar surfaces of FIG. 5A after the fiducial object has penetrated one of the surfaces.

FIGS. 5A and 5B show a concave portion of an object defined by two planar surfaces, 50 and 52 respectively. When the user interacts with a concave portion of an object, multiple surfaces can be active simultaneously. When the user interacts with the concave intersection 53 of the two planes 55 and 57, the haptic rendering application defines both planes, 55 and 57 respectively, as active constraints and the motion of the fiducial object 54 is restricted to the line defined by the intersection of the two planes 55 and 57. When the user is in contact with the intersection of three planar surfaces, all three surfaces are active constraints and the fiducial object is confined to the point defined by the intersection of the three surfaces. At the intersection of more than three surfaces, the haptic rendering application considers only three of the surfaces as active constraints at any one time and the fiducial object point is again confined to a point.

FIGS. 5A and 5B illustrate the situation that occurs when the user interacts with surfaces that intersect at an acute angle. FIG. 5A shows the location of the fiducial object point 54 when the user presses into the surface 50 to the location defined by the haptic interface point 56. As the user slides down along the surface 50, the fiducial object point 54 may cross over the surface 52 before the surface 52 meets the requirements outlined above to be defined as an active constraint.

FIG. 5B illustrates the situation in which the fiducial object point 54' has crossed over surface 52 before the surface 52 is considered an active constraint. According to the definition of an active constraint discussed above, surface 52 does not qualify as an active constraint in FIG. 5B because the haptic interface point 56' is not a negative distance from the plane 57 containing the surface 52. To solve this problem, in one embodiment, the haptic rendering application iterates the process of determining the new fiducial object point location. During the first iteration, the haptic rendering application determines a set of active constraints and calculates the new fiducial object point location 54'. During the second iteration the haptic rendering application uses the "new" fiducial object point location 54' as the haptic interface point location in combination with the "old" fiducial object point location 54 to check the neighboring surfaces to determine whether any additional surfaces qualify as active constraints. If the haptic rendering application determines that an additional surface qualifies as an active constraint, the haptic rendering application continues the iterations and updates the fiducial object point location until no new active constraints are found.

In one embodiment, once the complete set of active constraints is found, the haptic rendering application uses Lagrange multipliers to update the location of the fiducial object point. Lagrange multipliers are used in maximizing or minimizing functions which have several variables which are subject to constraints. In this embodiment, the virtual environment is described by a rectangular coordinate system having coordinate sets with three entries. The haptic rendering application uses equation (4) below to model the energy of a virtual spring of unity stiffness. In equation (4), Q represents the energy in a virtual spring between the fiducial object and the haptic interface, x, y and z represent the coordinates of the fiducial object point and $x_p$, $y_p$ and $z_p$ represent the coordinates of the haptic interface point. In equation (4), the spring constant equals 1. The goal in solving equation (4) is to minimize the value of Q, thereby making the virtual spring as small as possible.

$$Q = \frac{1}{2}(x - x_p)^2 + \frac{1}{2}(y - y_p)^2 + \frac{1}{2}(z - z_p)^2 \quad (4)$$

The haptic rendering application then adds the active constraints as planes according to equation (5). In equation (5), An, Bn and Cn indicate the direction of the surface normal to the plane containing the constraint. Dn indicates the distance from the origin of the plane containing the active constraint.

$$A_n x + B_n y + C_n z - D_n = 0 \quad (5)$$

The first step in utilizing Lagrange multipliers is to form a function L of the variables in the equation to be minimized and the equations defining the constraints. In the case of three constraints, L will be a function of x, y, z, $l_1$, $l_2$ and $l_3$, where $l_1$, $l_2$ and $l_3$ are the Lagrange multipliers. The function L will be in the form of:

L(x, y, z, $l_1$, $l_2$, $l_3$)=(function to be minimized)–$l_1$(constraint$_1$)–$l_2$(constraint$_2$)–$l_3$(constraint$_3$).

Following this model, the haptic rendering application combines equations (4) and (5) to generate equation (6).

$$L = \frac{1}{2}(x-x_p)^2 + \frac{1}{2}(y-y_p)^2 + \frac{1}{2}(z-z_p)^2 + l_1(A_1x + B_1y + C_1z - D_1) + l_2(A_2x + B_2y + C_2z - D_2) + l_3(A_3x + B_3y + C_3z - D_3) \quad (6)$$

The haptic rendering application calculates the new location of the fiducial object point by minimizing L in equation (6). To minimize L, the haptic rendering application first computes the six partial derivatives of equation (6). The haptic rendering application then minimizes L by setting all six partial derivatives of L to 0. This results in six simultaneous equations with six variables (x, y, z, $l_1$, $l_2$ and $l_3$) to solve for. The six partial derivative equations can be organized into a set of simultaneous equations represented by the matrix equation (7) below.

$$\begin{bmatrix} 1 & 0 & 0 & A_1 & A_2 & A_3 \\ 0 & 1 & 0 & B_1 & B_2 & B_3 \\ 0 & 0 & 1 & C_1 & C_2 & C_3 \\ A_1 & B_1 & C_1 & 0 & 0 & 0 \\ A_2 & B_2 & C_2 & 0 & 0 & 0 \\ A_3 & B_3 & C_3 & 0 & 0 & 0 \end{bmatrix} \begin{bmatrix} x \\ y \\ z \\ l_1 \\ l_2 \\ l_3 \end{bmatrix} = \begin{bmatrix} x_p \\ y_p \\ z_p \\ D_1 \\ D_2 \\ D_3 \end{bmatrix} \quad (7)$$

The matrix equation (7) has a number of useful properties. It is symmetric, the upper left hand corner (3×3) is always the identity matrix, the lower left hand corner is always a null matrix, and the matrix is invertible. Solving the matrix equation (7) also does not require row swapping. Because of these properties, x, y and z can be solved for in only 65 multiplicative operations. In the case when there are only two active constraints, the leftmost matrix is a (5×5) matrix and x, y and z can be solved for in only 33 multiplicative operations. In the single constraint case, the leftmost matrix is a (4×4) matrix and x, y and z can be solved for in only 12 multiplicative operations. As described above, when there are no active constraints, the fiducial object point is located at the position of the haptic interface point and no calculations are required.

Figure 6A:
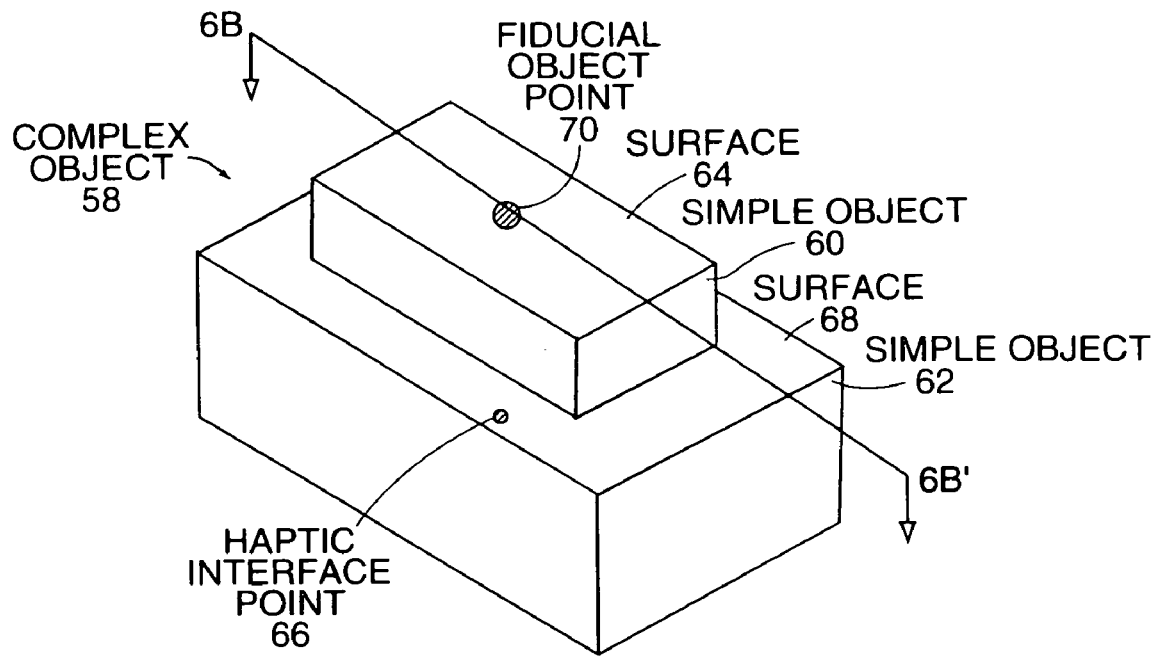
FIG. 6A is a perspective view of a complex virtual object formed from two simpler virtual objects.
Figure 6B:
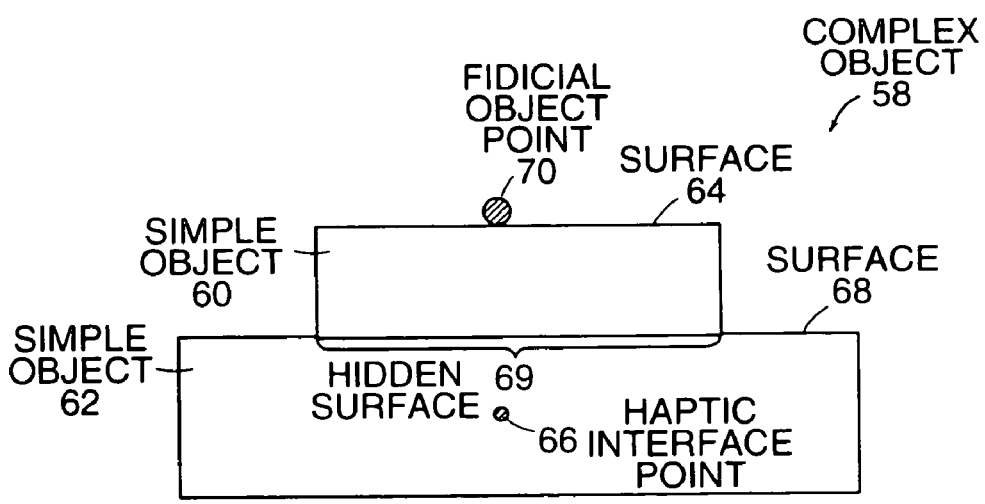
FIG. 6B is a cross-sectional view of the complex virtual object of FIG. 6A taken through line A–A' of FIG. 6A.

FIGS. 6A and 6B show an example of a complex object 58 formed from the overlapping of two simple objects, 60 and 62 respectively. As described above, one of the problems with existing haptic rendering applications is that they cannot determine the appropriate forces to apply to a user when the model of the environment overlaps simple objects to create more complex objects. When multiple objects are in close proximity, a naive active constraint detector will return too many active surfaces and the computed force will be incorrect. One embodiment of the method of the present invention includes a method for removing hidden surfaces to assure that the fiducial object point is located on the appropriate surface of the virtual object. A hidden surface is a surface of a virtual object which is covered by a surface of another virtual object.

In the example shown in FIGS. 6A and 6B, when a user presses down on surface 64, the haptic interface point 66 penetrates both surface 64 and surface 68. Without removing the hidden surface 69, the haptic rendering application would define both surfaces 64, 68 as active constraints and would not calculate the location of the fiducial object point 70 correctly.

Figure 7:
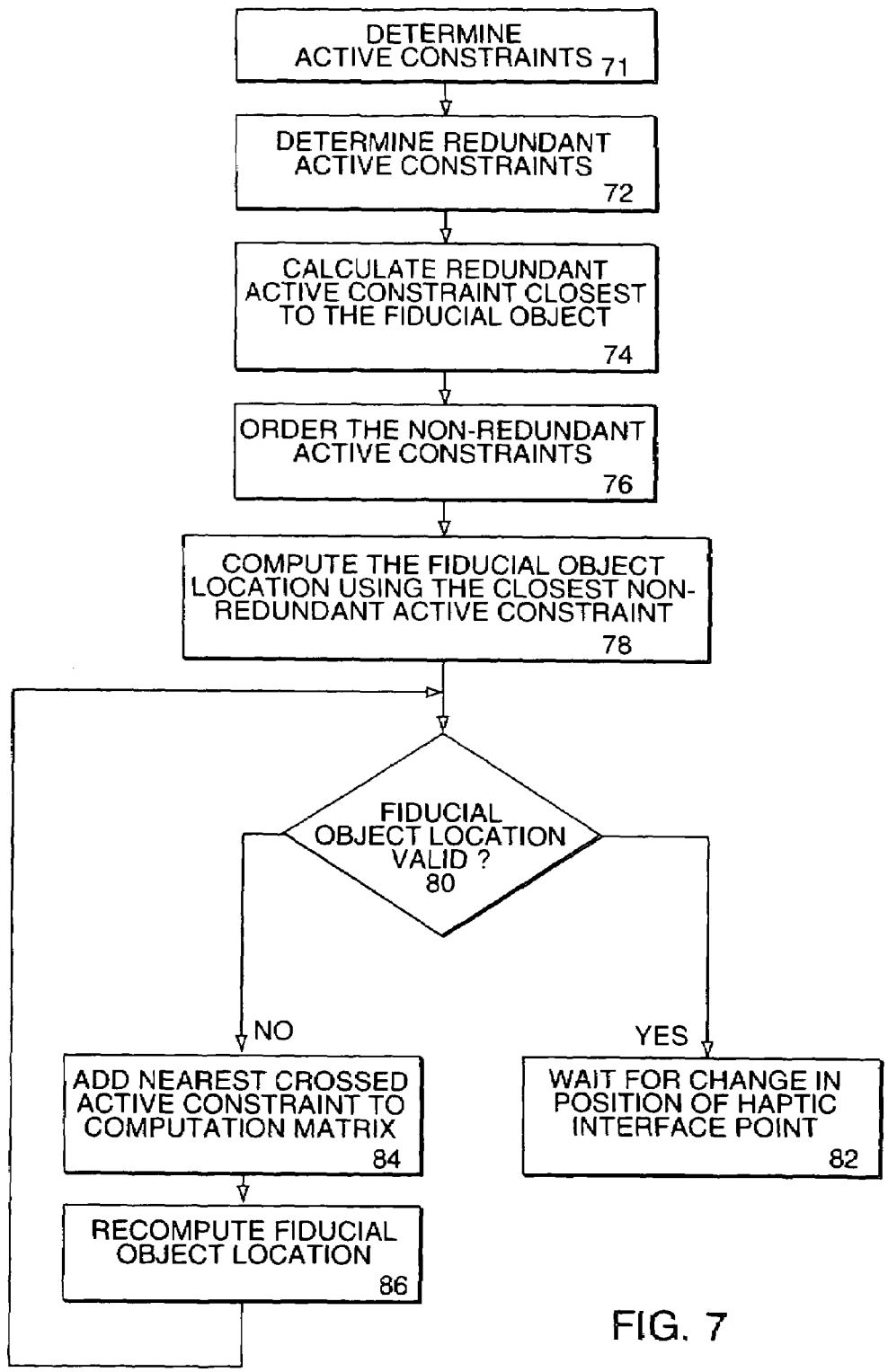
FIG. 7 is a flowchart representation of an embodiment of a process for removing hidden surfaces of complex virtual objects.

FIG. 7 shows a flowchart illustrating the steps performed by one embodiment of the present invention to remove hidden surfaces. In step 71, the haptic rendering application determines the surfaces that qualify as active constraints. In step 72, the haptic rendering application determines the redundant surfaces. Redundant surfaces are surfaces which have been defined as active constraints and which have the same or similar surface normals. Referring again to FIGS. 6A and 6B, surfaces 64 and 68 are redundant surfaces. Referring back to FIG. 8, in step 74, the haptic rendering application determines the redundant surface which is closest to the fiducial object and add this surface to the list of non-redundant active constraints. In step 76, the haptic rendering application orders the list of non-redundant active constraints by the distance of the active constraints to the fiducial object. Next, in step 78, the haptic rendering application computes the new fiducial object location using the closest non-redundant active constraint in equations (4)–(7) above. In step 80, the haptic rendering application determines whether the updated fiducial object location is valid. The updated fiducial object location is valid unless it penetrates a surface of the virtual object.

If the fiducial object location is valid, in step 82 the haptic rendering application waits for a change in position of the haptic interface point before repeating the process. If the fiducial object location is not valid, in step 84 the haptic rendering application adds the crossed active constraint which is nearest to the fiducial object point to the computation matrix of equation (7). Next, in step 86 the haptic rendering application recomputes the fiducial object location. The haptic rendering application then repeats steps 80, 84 and 86 until the computed fiducial object point location is valid.

When humans interact with objects in the real world, the objects exert both a normal force and a friction force to the human. In order to accurately model real world interactions with an object, one embodiment of the method of the present invention includes a method for determining and applying friction forces to a user.

Figure 8:
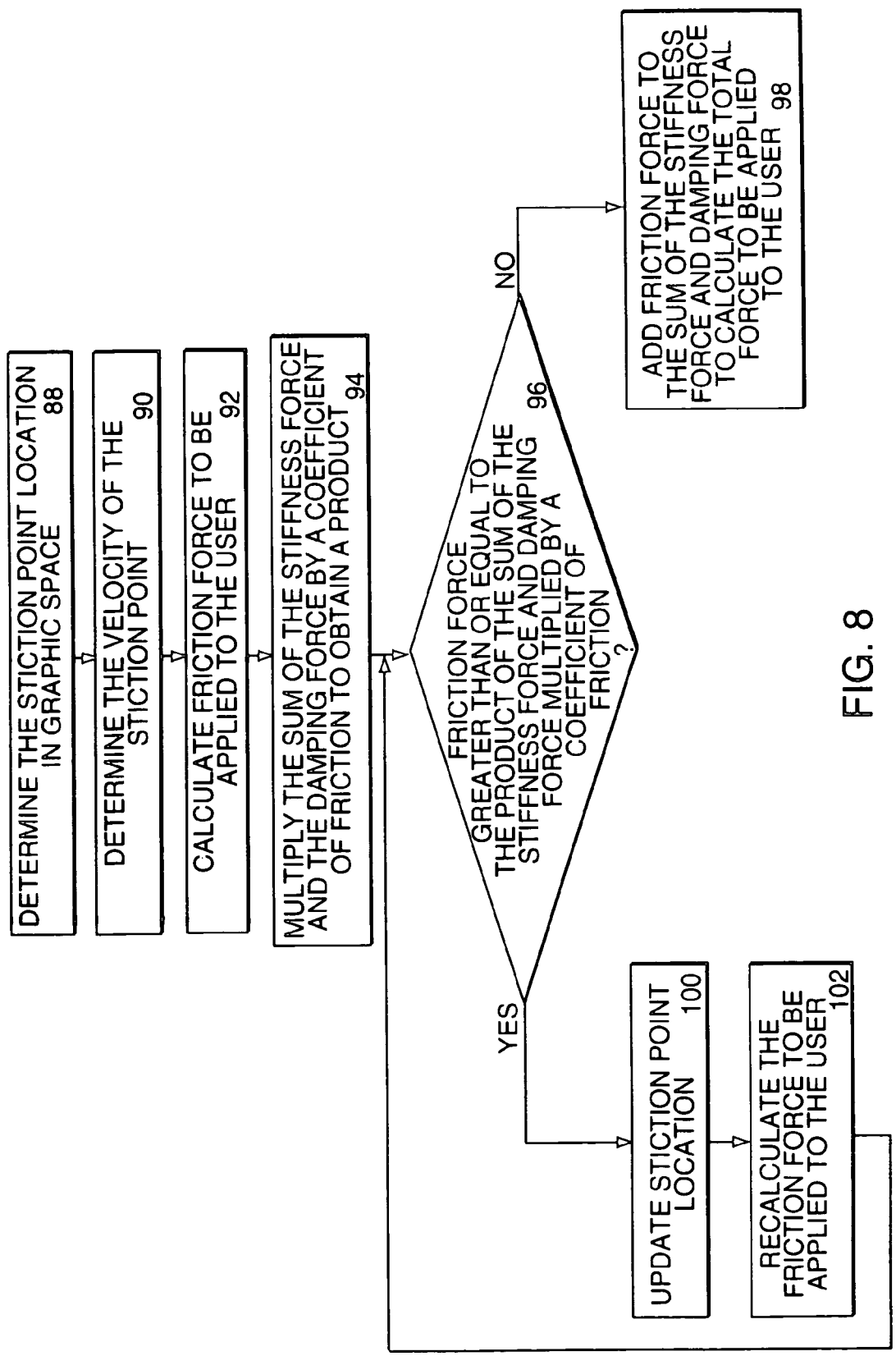
FIG. 8 is a flowchart representation of an embodiment of a process for determining a friction force to be applied to a user through a haptic interface.

FIG. 8 shows a flowchart of the steps performed by one embodiment of the present invention for determining the friction forces to be applied to a user in the real world through a haptic interface device. The method illustrated by the flowchart in FIG. 8 determines the static friction force to be applied to the user in real space. Friction models with stiction in general have two states of contact: stiction and kinetic friction. In the stiction state the user has made contact with an object but has not provided enough tangential force to "break away." When enough force is applied, a transition is made to the kinetic friction state. In the kinetic friction state a force is applied in a direction to impose the direction of motion. All friction forces are applied to the user in directions tangential to the feedback force discussed above.

In step 88, the haptic rendering application determines the location of the stiction point in graphic space. The location of the stiction point starts at the location in graphic space where the user first makes contact with the virtual object. The location of the stiction point is in reference to the location of the fiducial object. The location of the stiction point starts at the location where the fiducial object makes contact with the virtual object. Once the stiction point is determined, the haptic rendering application determines the velocity of the stiction point in step 90. Next, in step 92, the haptic rendering application calculates the friction force to be applied to the user in real space.

One embodiment of the present invention uses equations (8), (9) and (10) below to calculate the friction force to be applied to the user. In these equations, $x_{stiction-point}$ is the location of the stiction point, $x_{haptic-interface}$ is the location of the haptic interface and $\Delta x$ represents the displacement between the stiction point location and the haptic interface point location.

$$\Delta x = (x_{stiction-point} - x_{haptic-interface}) \quad (8)$$

$$\Delta x_{tangential} = (\Delta x - (\Delta x \cdot \hat{N}) \cdot \hat{N}) \quad (9)$$

In equation (9), $\Delta x_{tangential}$ represents the component of the displacement between the stiction point location and the haptic interface point location that is tangential to the surface of the virtual object. $\hat{N}$ is a unit vector which is normal to the surface of the virtual object and points outward from the surface. The purpose of equation (9) is to determine the component of the displacement vector between the stiction point location and the haptic interface point location that is not in the direction normal to the surface of the virtual object.

$$F_{friction} = k\Delta x_{tangential} + c\Delta \dot{x}_{tangential} \quad (10)$$

In equation (10), $F_{friction}$ represents the friction force to be applied to the user. k represents the maximum stiffness value of the surface that the haptic interface device can apply to the user without becoming unstable. c represents the maximum viscosity of the virtual object's surface that the haptic interface device can apply to the user without becoming unstable. When the haptic interface device attempts to apply a stiffness value (k) or a viscosity (c) that is greater than the maximum value, the haptic interface device may become unstable. In one embodiment, when the haptic interface device becomes unstable, it begins to vibrate. $\Delta \dot{x}_{tangential}$ represents the rate of change of the component of the displacement vector between the stiction point location and the haptic interface point location that is tangential to the surface of the virtual object.

After the haptic rendering application has determined the friction force to be applied to the user, one embodiment of the present invention calculates the total force to be applied to the user according to equation (11) below.

$$F_{total} = F_{feedback} + F_{friction} \quad (11)$$

In equation (11) the calculated friction force ($F_{friction}$) is added to the calculated feedback force ($F_{feedback}$) to determine the total force ($F_{total}$) to be applied to the user.

Referring again to the flowchart of FIG. 8, once the haptic rendering application has determined a friction force to be applied to a user, the haptic rendering application performs a series of steps according to equation (12) below to update the stiction point location and the friction force to be applied to the user.

$$F_{friction} \geq = \mu F_{feedback} \quad (12)$$

In equation (12) $F_{feedback}$ represents the sum of the stiffness force and the damping force calculated above. In step 94, the haptic rendering application multiplies the sum of the stiffness force and the damping force ($F_{feedback}$) by a coefficient of friction $\mu$ to obtain a product. In step 96, the haptic rendering application compares this product to the calculated friction force to determine whether the calculated friction force is greater than or equal to the product. The purpose of equation (12) is to determine whether the calculated friction force can be applied to the user without violating the laws of physics. If the friction force is too large and violates the laws of physics, the stiction point must be updated until a friction force is calculated that can be applied to the user without violating the laws of physics. If the friction force is less than the product, the haptic rendering application proceeds to step 98 and adds the friction force to the sum of the stiffness force and the damping force to calculate a total force to be applied to the user in real space through a haptic interface device. If the calculated friction force is greater than or equal to the product, the haptic rendering application proceeds to step 100 and updates the stiction point location according to equation (13) which will be discussed below. Next, in step 102 the haptic rendering application recalculates the friction force to be applied to the user and returns to step 96. The haptic rendering application repeats steps 96, 100 and 102 until the friction force is less than the product obtained in step 94.

In step 100 the haptic rendering application updates the position of the stiction point. When the old stiction point is broken, the new stiction point location is calculated using the new fiducial point location and the old stiction point location. The new stiction point is placed on the line intersecting the new fiducial object point and the old stiction point. The new stiction point is placed at a distance ($\Delta x_{tangential}$) from the new fiducial object point so that the force on the user is equal to the maximum friction force, as described by equation (13). In equation (13), c is the viscosity, $\mu$ is the coefficient of friction, k is the stiffness value of the surface and $F_{normal}$ is the calculated normal force. $\Delta \dot{x}_{tangential}$ represents the rate of change of the component of the displacement vector between the stiction point location and the haptic interface point location that is tangential to the surface of the virtual object.

$$\Delta x_{tangential} = \frac{\mu}{k} F_{normal} - \frac{c}{k} \Delta \dot{x}_{tangential} \quad (13)$$

In the real world there is an additional slipping sensation which a user experiences when the user is slipping relative to an object. Also, in the real world there is usually some vibration associated with slipping. In order to model the sensation of slipping, one embodiment of the method of the present invention utilizes two coefficients of friction. This embodiment uses one coefficient of friction to determine whether the stiction point location should be updated, and another slightly lower coefficient of friction for calculating the new location of the stiction point. The result of this method is that each time a new stiction point is placed, the friction force is lower, and a small distance must be traveled for the user to break away again.

Figure 9:
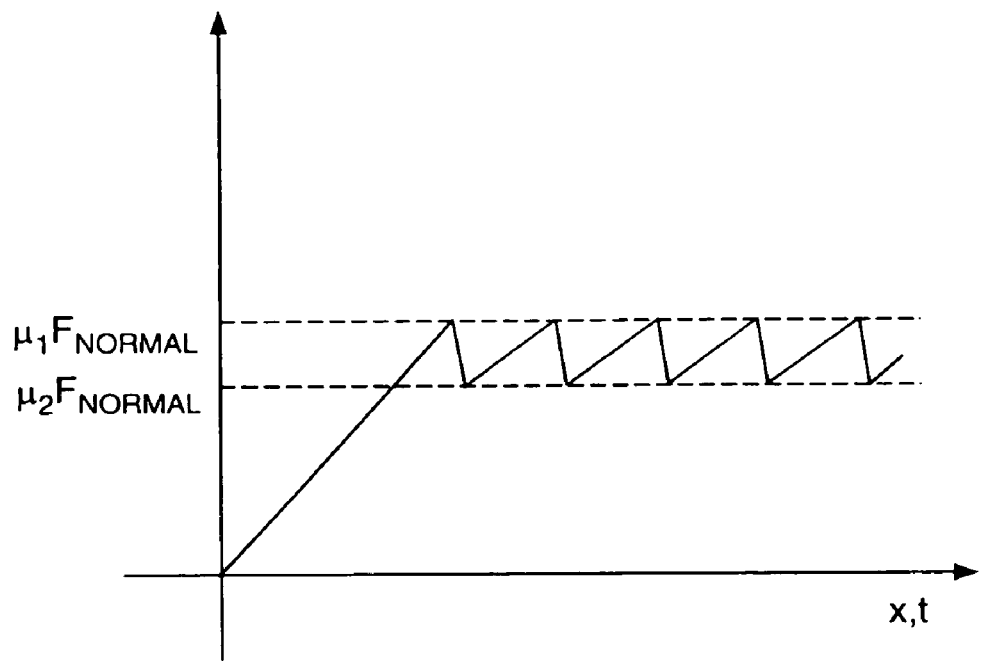
FIG. 9 is a graphical representation of a friction force applied to a user to model friction with slip.

FIG. 9 shows the saw-tooth wave that results when a constant relative velocity is specified between the fiducial object and the virtual object being touched. When the stiction point is updated, the new position is calculated using a coefficient of friction that is smaller than the one used to determine whether the maximum friction force has been exceeded. When a constant velocity is specified a vibration is felt due to the saw-tooth like variation in friction force.

One embodiment of the method of the present invention uses equations (14) and (15) below to model friction with slip. As discussed above, since the fiducial object can not penetrate the surface of a virtual object, when the haptic interface has penetrated the surface of a virtual object, the fiducial object remains on the surface of the virtual object. Therefore, as long as the fiducial object remains on the surface of the virtual object there is no non-tangential motion of the fiducial object with respect to the surface of the virtual object and equation (9) above can be simplified to equation (14) below.

$$\Delta x_{tangential} = (x_{stiction-point} - x_{fiducial-object}) \quad (14)$$

$\Delta x_{tangential}$ represents the component of the displacement between the stiction point location ($X_{stiction-point}$) and the fiducial object point location ($X_{fiducial-object}$) that is tangential to the surface of the virtual object.

If the feedback force calculated above is zero (0) then the stiction point should be collocated with the fiducial object point. The position of the stiction point should only be updated when the distance from the fiducial object point to the stiction point exceeds the distance from the haptic interface point to the fiducial object point multiplied by the coefficient of friction (μ). The stiction point location ($X_{stiction-point}$) can then be used in combination with the haptic interface point location ($X_{haptic-interface}$) and the stiffness value (k) of the surface to calculate the change in force ($\Delta F_{total}$) to be applied to the user according to equation (15) below.

$$\Delta F_{total} = k(x_{stiction-point} - x_{haptic-interface}) \quad (15)$$

In yet another embodiment of the present invention, the haptic rendering application performs surface smoothing of a virtual object. In the real world, it is common for the properties of an object to vary across its surface. Therefore, to provide a comparable experience to the user of a haptic interface system, the present invention provides a haptic rendering application for providing to the user tactile feedback of the properties of the surface of an object being touched.

In one embodiment, the present invention provides such feedback to the user by dividing the surface of an object into a mesh of planar surfaces, assigning values to nodes defined by intersecting points in the planar surfaces, and utilizing such values in an interpolation scheme. This method of using planar surfaces effectively provides a human with the sensation of feeling surface characteristics, notwithstanding the absence of curved surfaces. Planar surfaces can be used to accurately model an object's surface because of the fact that humans have a rather poor sense of position but are extremely sensitive to discontinuities of force direction. If the force exhibited at points normal to the object are smoothed, then the actual shape of the object need not be as true to its actual shape in the real world to provide the user with an adequate simulation of the object.

Figure 10:
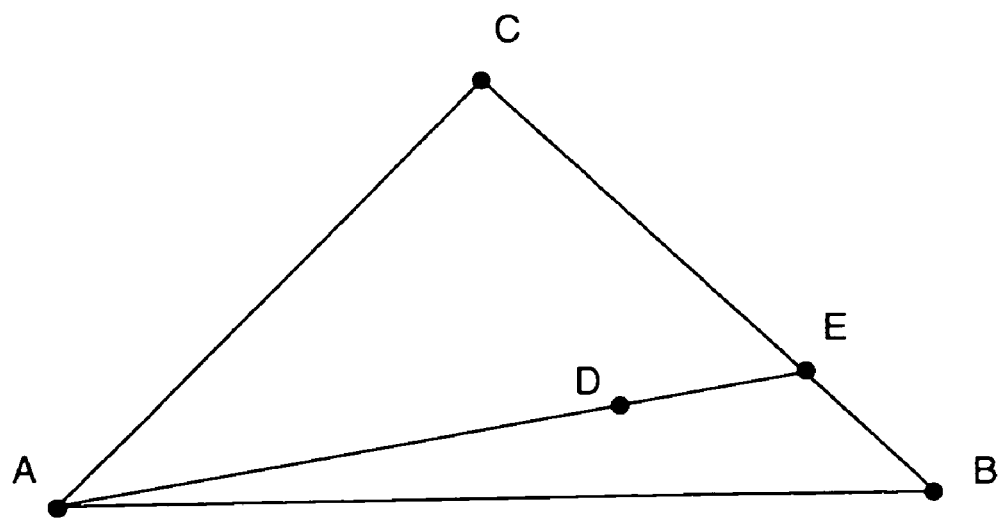
FIG. 10 is a pictorial view of one of the triangular planar surfaces forming the surface of a virtual object.

Referring to FIG. 10, shown is one of the triangular planar surfaces forming a virtual object simulated by the haptic rendering application of one embodiment of the present invention. In this figure, the planar surface forms a triangle, however planar surfaces of other shapes can be used. Typically, the virtual object comprises a plurality of such planar surfaces, as described above and shown in FIG. 3. The haptic rendering application assigns to the triangle a plurality of nodes shown as A, B, and C. As further described below, by assigning a parameter value representing a surface characteristic to each of the nodes of the polyhedra and interpolating the parameter values between nodal values, parameter values at other points within the triangular surface can be determined. In this manner, the haptic rendering application provides continuity in the direction of the force applied to the user across the area defined by the triangle.

Figure 11:
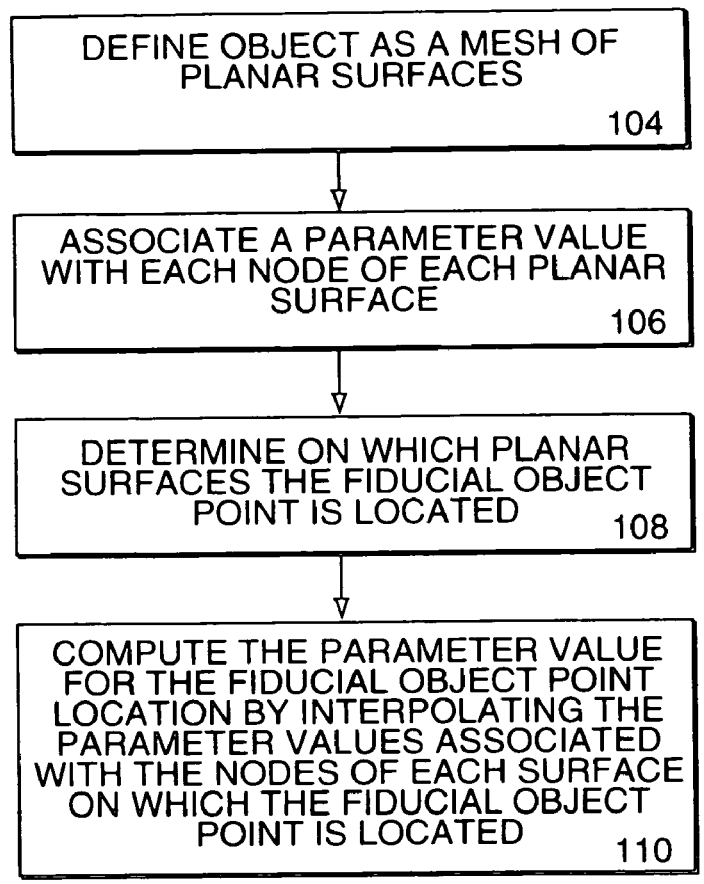
FIG. 11 is a flowchart representation of an embodiment of a process for performing surface smoothing of a virtual object.

Referring to FIG. 11, a flowchart shows the steps employed by one embodiment of the haptic rendering application of the present invention for performing a method of surface smoothing. In step 104, the haptic rendering application defines an object as a mesh of planar surfaces. Referring again to FIG. 3, the planar surfaces define a plurality of polyhedra, each having a plurality of nodes associated therewith. In step 106, the haptic rendering application assigns a parameter value to each node of each planar surface. In one embodiment, the parameter value is the surface normal. Alternatively, in other embodiments of the invention, the parameter may be a stiffness force or a damping force. In step 108, the haptic rendering application determines on which planar surfaces the fiducial object point is located. As discussed above, the fiducial object point represents the location in graphic space at which the haptic interface point would be located if the haptic interface point could be prevented from penetrating virtual objects. By determining the planar surfaces on which the fiducial object point is located, the haptic rendering application determines the nodes and corresponding parameter values to be utilized in the interpolation scheme to provide a user with a tactile sensation of the surface characteristics of that point. In step 110, the haptic rendering application computes the parameter value at the location of fiducial object point by interpolating the parameter values associated with the nodes assigned to the planar surfaces on which the fiducial object is located.

Referring again to FIG. 10, the fiducial object point is located at point D. In step 108 as described above, the haptic rendering application determines that the fiducial object lies in the planar surface defined by nodes A, B, and C. After determining the nodes defining the planar surface, the interpolation scheme described in step 110 can be accomplished by projecting the vector $\overline{AD}$ to the line $\overline{BC}$ to determine the point E. The parameter value for point E is found by interpolating the parameter values of nodes B and C, and is shown mathematically by equation (16) below.

$$\hat{E} = \left|\frac{\overline{BE}}{\overline{BC}}\right|\hat{B} + \left|\frac{\overline{CE}}{\overline{BC}}\right|\hat{C} \quad (16)$$

Once the parameter value at point E is determined, the parameter value at fiducial object point D is determined in a similar fashion. The parameter value at point D is determined by interpolating between the points A and E, shown mathematically by equation (17) below.

$$\hat{D} = \left|\frac{\overline{AD}}{\overline{AE}}\right|\hat{A} + \left|\frac{\overline{DE}}{\overline{AE}}\right|\hat{E} \quad (17)$$

Figure 12:
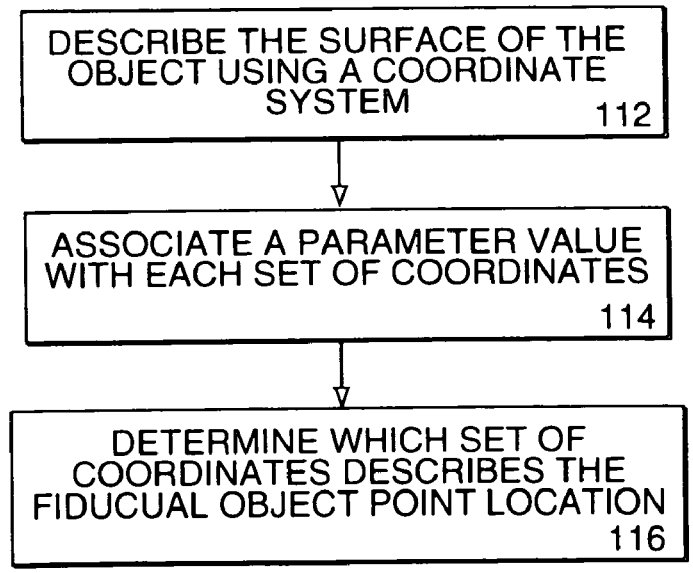
FIG. 12 is a flowchart representation of another embodiment of a process for performing surface smoothing of a virtual object.

Referring to FIG. 12, a flowchart shows the steps employed by another embodiment of the haptic rendering application of the present invention for performing a method of surface smoothing. In this embodiment, the present invention provides tactile feedback of the surface characteristics of a virtual object to the user through the aid of a coordinate mapping system. Through the use of a coordinate mapping system, the tactile sensation of the varying characteristics of the virtual object can be simulated. Such characteristics can include the texture, as well as the stiffness and damping characteristics of the virtual object. As shown in step 112, the haptic rendering application initially describes the surface of the object using a coordinate system. In one embodiment, the coordinate system is a rectangular coordinate system. In other embodiments, the coordinate system may be a spherical or cylindrical coordinate system.

In step 114, each coordinate set comprising the coordinate system is assigned a parameter value representing a characteristic of the virtual object. The characteristic may be a stiffness value, a damping coefficient or a surface normal.

For example, part of the object may be smoother than another portion. To accurately model this, the parameter values at the corresponding coordinate sets would vary accordingly. In step 116, the haptic rendering system determines which set of coordinates describes the location of the fiducial object point. Once this set of coordinates is known, the parameter value representing the surface characteristic at the fiducial object point location is known and can be used to determine a force to be applied to the user representing the texture, stiffness or damping characteristics of the virtual object.

In this embodiment of the invention, the force applied to the user is a function of position and changes as the user moves across the surface of the virtual object. Given that the human sensation of texture is carried out by the mechanoreceptors in one's finger tip, such changes in forces applied to the user's fingertip adequately simulate such characteristics as texture.

Figure 13:
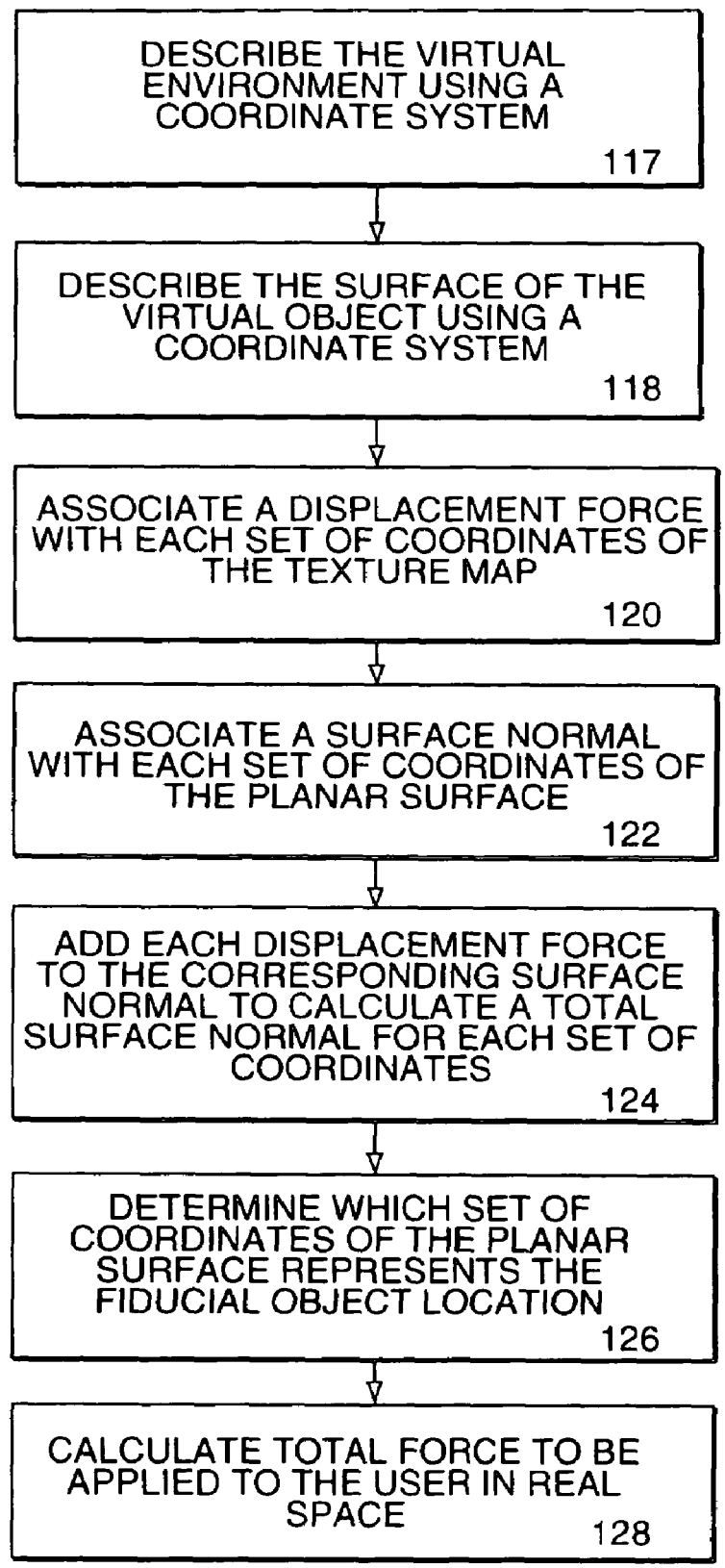
FIG. 13 is a flowchart representation of embodiment of a process for modeling texture on the surface of a virtual object.

Referring to FIG. 13, a flowchart illustrates the steps employed by yet another embodiment of the haptic rendering application of the present invention for performing a method of surface smoothing. In this embodiment, the present invention provides tactile feedback of the surface characteristics of a virtual object to the user through the aid of a coordinate mapping system known as bump mapping. In the graphics world, bump maps are used to correctly display the illumination of a bumpy surface. Similar to the coordinate mapping system described above, bump maps use coordinate systems to associate a small displacement force to be applied to the user in a direction normal to the surface of the virtual object. The application of a small displacement force models the texture of a surface. For example, as a user moves along a surface, the user can experience the feeling of a bumpy surface.

Figure 14A:
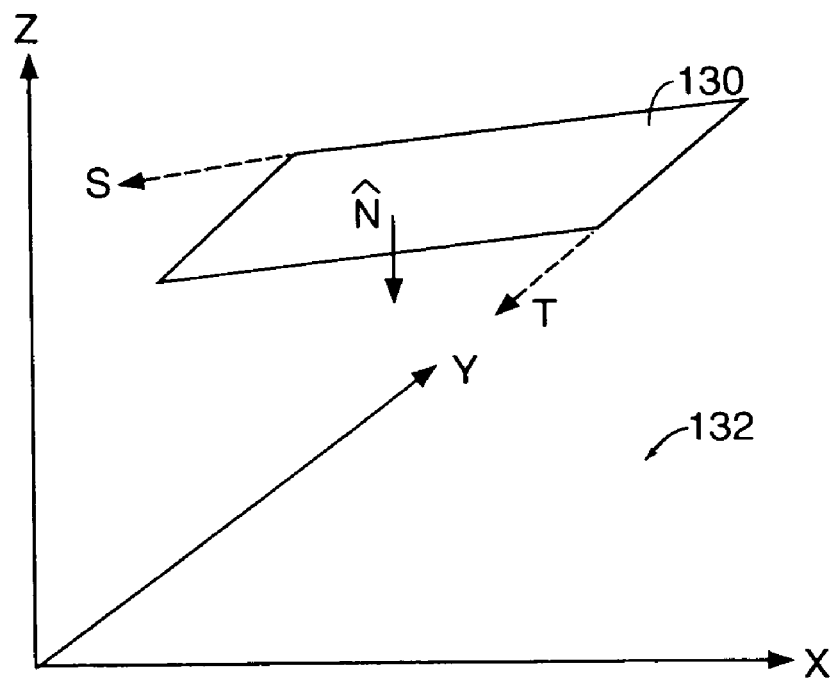
FIG. 14A is a pictorial view of one of the planar surfaces forming the surface of a virtual object.

Referring to step 117, the haptic rendering application initially describes the virtual environment using a coordinate system. The coordinate system can be a rectangular, spherical or cylindrical coordinate system. Referring now to FIG. 14A, a graph shows a planar surface 130 of a virtual object. In FIG. 14A, the haptic rendering application defines the virtual environment, designated generally by reference numeral 132, using a rectangular coordinate system having x, y, and z axes which are orthogonal to each other.

Referring again to FIG. 13, in step 118 the haptic rendering application next describes the surface of the object using a coordinate system. The coordinate system can be a rectangular, spherical or cylindrical coordinate system. In FIG. 14A, the haptic rendering application describes the planar surface 130 using a rectangular coordinate system having s and t axes. In certain embodiments, the s and t axes may not be orthogonal. The coordinates of the (s, t) coordinate system can be mapped into the (x, y, z) coordinate system through a series of transformation equations in which s is a function of x, y and z and t is a function of x, y and z.

Figure 14B:
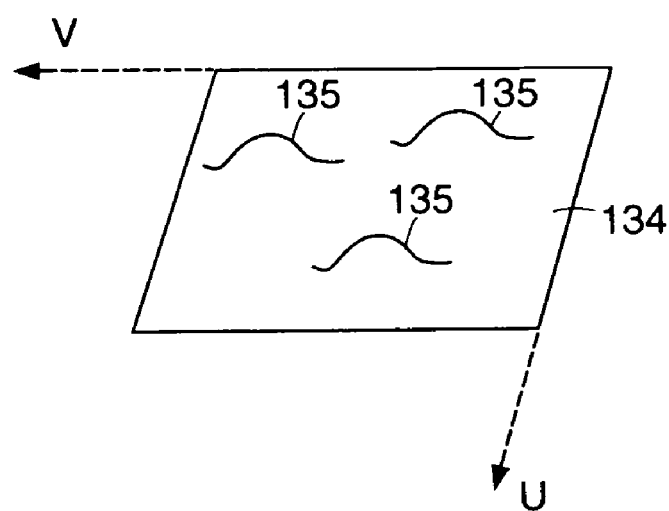
FIG. 14B is a pictorial view of the texture map to be mapped onto the planar surface of FIG. 14A.

FIG. 14B shows the texture map 134 to be applied to the planar surface 130. The texture map 134 is defined by a third coordinate system having u and v axes. The texture map represents the texture to be assigned to the planar surface 130. For example, the bumps 135 illustrate displacement forces to be applied to a user to simulate a bumpy surface. A second series of transformation equations maps the coordinates (s, t) of the planar surface 130 to the equivalent (u, v) coordinates of the texture map 134.

Referring again to FIG. 13, in step 120, each coordinate set (u, v) of the texture map coordinate system is assigned a displacement value to be applied in the direction normal to the surface of the virtual object. This displacement value represents the force that would be exerted by the surface of the virtual object on the user. The texture function B(u, v) represents the displacement values assigned to the coordinate sets (u, v). For example, in one embodiment, the texture function B(u, v) represents the height of a bump to be experienced by a user as a function of the user's position in the texture map. As shown in step 122, the haptic rendering application also associates a surface normal for each set of coordinates (s, t) of the planar surface coordinate system.

The embodiment shown in FIGS. 4A and 4B utilizes rectangular coordinate systems and the surface of the virtual object 130 has surface coordinates (s, t) and the texture map 134 has coordinates (u, v). In step 124, the haptic rendering application calculates the new surface normal $\overline{N}_{new}$ for each set of coordinates by adding the displacement force of the texture coordinates (u, v) to the corresponding surface normal of the planar surface coordinates (s, t) as shown below by equation (18).

$$\overline{N}_{new} = \overline{N} + \frac{B_u(\overline{N} \times \overline{P}_t) - B_v(\overline{N} \times \overline{P}_s)}{|\overline{N}|} \qquad (18)$$

In equation (18) $\overline{N}$ is the surface normal to the planar surface 130. Bu and Bv are the partial derivatives of the texture function B(u, v) with respect to the u and v directions. Bu represents the curvature of the bump in the u direction and Bv represents the curvature of the bump in the v direction. $\overline{P}_s$ and $\overline{P}_t$ are the partial derivatives of the equation $\overline{P}=[x(s, t), y(s, t), z(s, t)]$ in the s and t directions. $\overline{P}_s$ and $\overline{P}_t$ represent the unit vectors in the planar surface coordinate system illustrated in FIG. 14A.

Associating an additional displacement force to certain coordinate sets replicates where a bump is to appear on a virtual object's surface and be sensed by the user's hand. As shown in step 126, the haptic rendering application then determines which coordinate set describes the fiducial object point. In step 128, the haptic rendering application determines the total surface normal corresponding to that coordinate set and uses that total surface normal to determine the appropriate force to be administered to the user. The haptic rendering application thereby represents the existence of a bump on the surface of the virtual object to the user.

This embodiment of the invention can be used to simulate materials like wood, sand paper, or rusted metal, for example.

Figure 15:
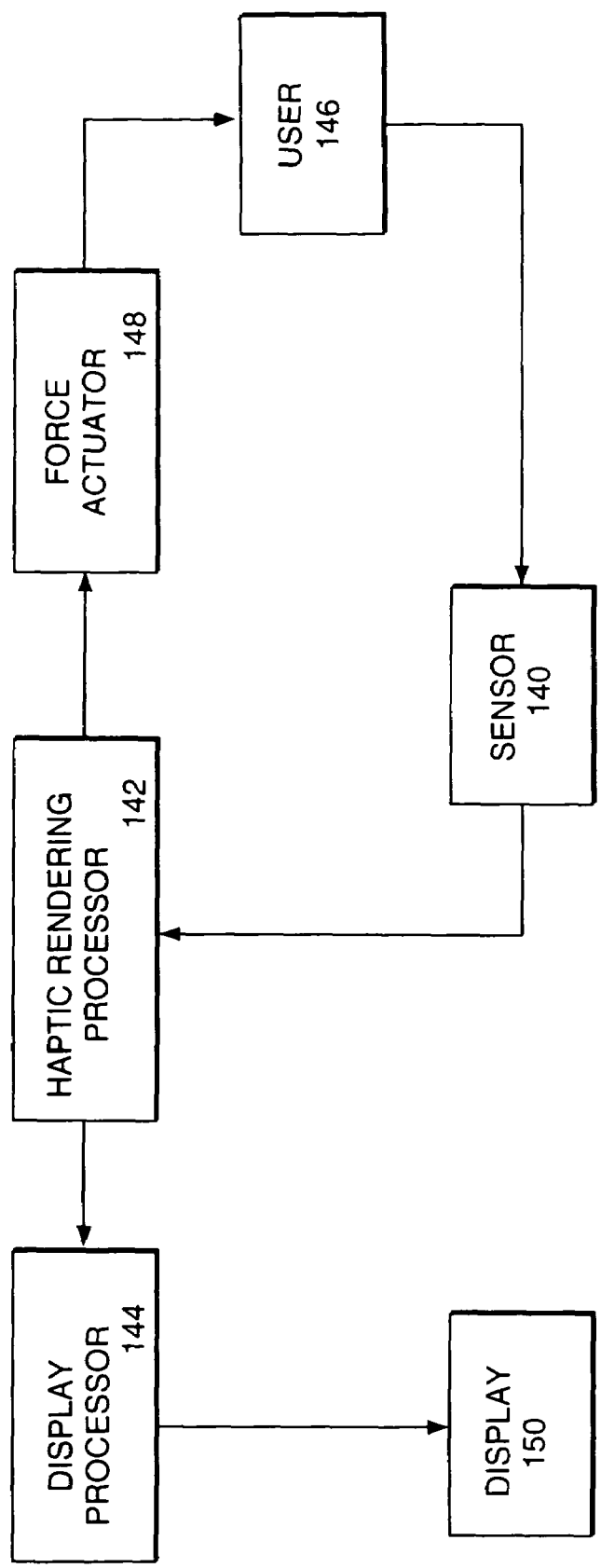
FIG. 15 is a flow diagram of one embodiment of the invention.

The present invention also relates to an apparatus for determining forces to be applied to a user through a haptic interface. FIG. 15 shows an embodiment of an apparatus for determining forces to be applied to a user through a haptic interface. The apparatus includes a sensor 140, a haptic rendering processor 142 for determining the forces to be applied to the user, a display processor 144, a force actuator 148 and a display 150. The purpose of sensor 140 is to sense the position of the user 146. The sensor 140 may be any of the devices known in the art for sensing positions of objects. The haptic rendering processor 142 is in electrical communication with the sensor 140 and executes an algorithm to determine the forces to be applied to the user 146 in real space. The algorithm includes a module generating a representation of a real world object in graphic space, a module determining the user's haptic interface in graphic space, a module determining the user's fiducial object in graphic space and a module calculating a force to be applied to the user in real space. The module determining the user's haptic interface in graphic space translates the position of the user in real space into a position in graphic space. The module determining the user's fiducial object in graphic space determines the location at which the haptic interface would be if the haptic interface could be prevented from penetrating virtual objects. In one embodiment, the user's haptic interface and fiducial object are points in graphic space. In one embodiment, the module calculating a force to be applied to the user in real space calculates a stiffness force to be applied to the user. In other embodiments, this module calculates a damping force, a friction force or a combination of forces to be applied to the user.

The display processor 144 is in electrical communication with the haptic rendering processor 142. The display processor 144 displays the representation of the real world object created by the haptic rendering processor 142 on a display 150. In one embodiment, the display processor 144 also displays the user's fiducial object location on the display 150. The user's fiducial object location represents the position of the user in graphic space relative to the virtual object The display 150 may be a computer screen, television screen, or any other device known in the art for displaying images of objects. The display 150 may also produce audio sounds in response to the interactions of objects in virtual space.

The force actuator 148 is in electrical communication with the haptic rendering processor 142. The force actuator 148 produces the force calculated by the haptic rendering processor 142 and applies the calculated force to the user 146. The force actuator 148 may be any device known in the art for applying a force to an object.

In one embodiment the haptic rendering processor 142 and the display processor 144 are different processors. In another embodiment, the haptic rendering processor 142 and the display processor 144 are the same processor. In yet another embodiment, the module generating a representation of an object in graphic space, the module determining the user's haptic interface in graphic space, the module determining the user's fiducial object in graphic space, and the module calculating a force to be applied to the user in real space are separate devices.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. A method for determining forces to be applied to a user through a haptic interface, the method comprising the steps of:
   generating a representation of a virtual object in graphic space;
   determining a haptic interface location in graphic space in response to a location of a user-manipulated haptic interface in real space, wherein the haptic interface can penetrate a surface of the virtual object in graphic space;
   determining a fiducial object location in graphic space on the surface of the virtual object, wherein the fiducial object location represents a location the haptic interface would occupy if the haptic interface could not penetrate the surface of the virtual object; and
   calculating a force to be applied to the user in response to the haptic interface location and the fiducial object location.

2. The method of claim 1, wherein the haptic interface is represented by a single point and the fiducial object is represented by a single point.

3. The method of claim 1, wherein the fiducial object is represented as a three dimensional object.

4. The method of claim 3, wherein the three dimensional object is approximated by a series of points.

5. The method of claim 1, wherein the fiducial object is represented as a three dimensional object, the three dimensional object is approximated by a series of points, and the haptic interface location is a single point.

6. The method of claim 1, wherein the step of determining the fiducial object location comprises the steps of:
   generating a representation of a virtual object within a computer; and
   computing the fiducial object location, such that the distance between the fiducial object location and the haptic interface location is minimized while maintaining that the fiducial object not pass through the virtual object.

7. The method of claim 6, wherein the geometric representation of the virtual object is generated from a standard computer graphic file format.

8. The method of claim 6, further comprising the step of calculating a reaction force to send to the user, wherein the reaction force depends on a distance between the haptic interface location and the fiducial object location.

9. The method of claim 8, wherein the reaction force is proportional to the distance.

10. The method of claim 8, wherein the step of calculating the reaction force involves calculating a component of the reaction force which depends on a difference in velocity between the haptic interface location and the fiducial object location.

11. The method of claim 10, wherein the component of the reaction force which depends on the difference in velocity between the haptic interface location and the fiducial object location is proportional to the difference in velocity.

12. The method of claim 6, further comprising the step of displaying a representation of the fiducial object on a display in a location relative to the virtual object location.

13. The method of claim 12, wherein the fiducial object location is different from the haptic interface location.

14. The method of claim 12, wherein the fiducial object is substantially co-located with the haptic interface location.

15. The method of claim 6, wherein the method is performed iteratively until a valid fiducial object location is found.

16. The method of claim 15, wherein multiple surfaces of at least one virtual object are considered in calculating a valid fiducial object location.

17. The method of claim 6, wherein the virtual object deforms in response to force applied to the virtual object by the user.

18. The method of claim 17, wherein the applied force comprises at least one of a damping force, a stiffness force, and a friction force.

19. The method of claim 17, wherein the applied force comprises at least two of a damping force, a stiffness force, and a friction force.

20. The method of claim 17, wherein the applied force comprises a damping force, a stiffness force, and a friction force.

21. A system for determining force to be applied to a user through a haptic interface, the system comprising:
   a modeling module that generates a representation of a virtual object in graphic space;
   a computation module that determines a haptic interface location in graphic space in response to a location of a user-manipulated haptic interface in real space, wherein the haptic interface can penetrate a surface of the virtual object in graphic space;
   a locating module that determines a fiducial object location in graphic space on the surface of the virtual object, wherein the fiducial object location represents a location the haptic interface would occupy if the haptic interface could not penetrate the surface of the virtual object; and
   a force computation module that calculates a force to be applied to the user in response to the haptic interface location and the fiducial object location.

22. The system of claim 21, further comprising:
   a simulation module that computes the fiducial object location such that distance between the fiducial object location and the haptic interface location is minimized while maintaining a condition that the fiducial object not pass through the virtual object.

23. The system of claim 22, further comprising a display module that displays a representation of the fiducial object on a display in a location relative to the virtual object location.

24. The system of claim 21, wherein the haptic interface is represented by a single point and the fiducial object is represented by a single point.

25. The system of claim 21, wherein the fiducial object is represented as a three dimensional object.

26. The system of claim 25, wherein the three dimensional object is approximated by a series of points.

27. The system of claim 21, wherein the fiducial object is represented as a three dimensional object, the three dimensional object is approximated by a series of points, and the haptic interface location is a single point.

28. The system of claim 21, further comprising:
   a generation module that generates a representation of a virtual object within a computer; and
   a displacement module that computes the fiducial object location such that distance between the fiducial object location and the haptic interface location is minimized while maintaining a condition that the fiducial object not pass through the virtual object.

29. The system of claim 21, wherein a geometric representation of the virtual object is generated from a standard computer graphic file format.

30. The system of claim 21, further comprising a module that calculates a reaction force to apply to the user wherein the reaction force depends on distance between the haptic interface location and the fiducial object location.

31. The system of claim 30, wherein the reaction force is proportional to the distance.

32. The system of claim 30, wherein the module that calculates the reaction force calculates a component of the reaction force which depends on a difference in velocity between the haptic interface location and the fiducial object location.

33. The system of claim 32, wherein the component of the reaction force which depends on the difference in velocity between the haptic interface location and the fiducial object location is proportional to the difference in velocity.

34. The system of claim 21, further comprising a display for displaying a representation of the fiducial object on the display in a location relative to the virtual object location.

35. The system of claim 34, wherein the fiducial object location is different from the haptic interface location.

36. The system of claim 34, wherein the fiducial object is substantially co-located with the haptic interface location.

37. The system of claim 21, further comprising a controller module that causes the locating module to iterate until a valid fiducial object location is found.

38. The system of claim 37, wherein the locating module considers multiple surfaces of one or more virtual objects in calculating a valid fiducial object location.

39. The system of claim 21, wherein the virtual object is adapted to deform in response to force applied to the virtual object by the user.

40. The system of claim 39, wherein the applied force comprises at least one of a damping force, a stiffness force, and a friction force.

41. The system of claim 39, wherein the applied force comprises at least two of a damping force, a stiffness force, and a friction force.

42. The system of claim 39, wherein the applied force comprises a damping force, a stiffness force, and a friction force.

43. A method for determining forces to be applied to a user through a haptic interface, the method comprising the steps of:
   (a) generating a representation of an object in graphic space by defining the object as a mesh of planar surfaces, each of the planar surfaces comprising nodes;
   (b) sensing a location of a user in real space;
   (c) determining a haptic interface location in graphic space in response to the location of the user in real space;
   (d) determining a fiducial object location on the surface of the object in graphic space;
   (e) calculating a stiffness force to be applied to the user in real space in response to the haptic interface location and the fiducial object location in graphic space; and
   (f) calculating a magnitude of a damping force to be applied to the user in real space in response to the haptic interface location and the fiducial object location in graphic space, further comprising the steps of:
      (i) associating a damping coefficient with each of the nodes of each of the planar surfaces;
      (ii) determining on which of the planar surfaces the fiducial object is located; and
      (iii) computing a damping coefficient of the fiducial object location by interpolating the damping coefficients associated with the nodes of each of the planar surfaces on which the fiducial object is located.

44. A method for determining forces to be applied to a user through a haptic interface, the method comprising the steps of:
   (a) generating a representation of an object in graphic space by defining the object as a mesh of planar surfaces, each of the planar surfaces comprising nodes;
   (b) sensing a location of a user in real space;
   (c) determining a haptic interface location in graphic space in response to the location of the user in real space;
   (d) determining a fiducial object location on the surface of the object in graphic space;
   (e) calculating a stiffness force to be applied to the user in real space in response to the haptic interface location and the fiducial object location in graphic space; and (f) calculating a direction of a damping force to be applied to the user in real space in response to the haptic interface location and the fiducial object location in graphic space, further comprising the steps of:
  (i) associating a surface normal with each of the nodes of each of the planar surfaces;
  (ii) determining on which of the planar surfaces the fiducial object is located; and
  (iii) computing a surface normal for the fiducial object location by interpolating the surface normals associated with the nodes of each of the planar surfaces on which the fiducial object is located.

* * * * *